(12) United States Patent
Terasaki et al.

(10) Patent No.: US 10,731,841 B2
(45) Date of Patent: Aug. 4, 2020

(54) LIGHT SOURCE APPARATUS AND IMAGE DISPLAY APPARATUS

(71) Applicant: SONY CORPORATION, Tokyo (JP)

(72) Inventors: Kazuya Terasaki, Shizuoka (JP); Daisuke Ogawa, Aichi (JP); Hiroyuki Meguro, Kanagawa (JP); Takashi Takamatsu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/141,178

(22) Filed: Sep. 25, 2018

(65) Prior Publication Data

US 2019/0024880 A1 Jan. 24, 2019

Related U.S. Application Data

(63) Continuation of application No. 15/613,917, filed on Jun. 5, 2017, now Pat. No. 10,113,736, which is a (Continued)

(30) Foreign Application Priority Data

Jun. 6, 2013 (JP) .................................. 2013-119834

(51) Int. Cl.
  *G03B 21/16* (2006.01)
  *F21V 29/67* (2015.01)
  (Continued)

(52) U.S. Cl.
  CPC .............. *F21V 29/67* (2015.01); *F21V 14/08* (2013.01); *G03B 21/16* (2013.01); *G03B 21/204* (2013.01);
  (Continued)

(58) Field of Classification Search
  CPC .... G03B 21/16; G03B 21/145; G03B 21/204; G03B 21/2033; G03B 21/2066; H04N 9/3141; H04N 9/3144; H04N 9/3161
  See application file for complete search history.

(56) References Cited

U.S. PATENT DOCUMENTS 8,967,811 B2 * 3/2015 Jaffe ....................... F21V 9/083
  353/31
2006/0170876 A1 8/2006 Takemi et al.
(Continued)

FOREIGN PATENT DOCUMENTS

JP 2004-053692 A 2/2004
JP 2007-193990 A 8/2007
(Continued)

OTHER PUBLICATIONS

International Search Report dated Aug. 5, 2014 in PCT/JP2014/002408.

(Continued)

*Primary Examiner* — Sultan Chowdhury
(74) *Attorney, Agent, or Firm* — Oblon, McClelland, Maier & Neustadt, L.L.P.

(57) ABSTRACT

A light source apparatus including a light source section including one or more solid light sources capable of emitting light of a predetermined wavelength band as incident light; a light outputting section including a light emitting body to be excited by incident light from the light source section and to emit visible light having a wavelength band longer than a wavelength of the incident light, the light outputting section being capable of emitting synthetic light containing light having the predetermined wavelength band and visible light from the light emitting body; and a housing holding the light source section and the light outputting section, the housing including an inlet and an outlet formed not to face (Continued)

a light path of the incident light from the light source section to the light outputting section.

17 Claims, 14 Drawing Sheets

Related U.S. Application Data continuation of application No. 14/784,081, filed as application No. PCT/JP2014/002408 on May 2, 2014, now Pat. No. 9,702,538.

(51) Int. Cl.
  *G03B 21/20* (2006.01)
  *G03B 33/12* (2006.01)
  *H04N 9/31* (2006.01)
  *F21V 14/08* (2006.01)

(52) U.S. Cl.
  CPC ..... *G03B 21/2013* (2013.01); *G03B 21/2066* (2013.01); *G03B 21/2073* (2013.01); *G03B 33/12* (2013.01); *H04N 9/31* (2013.01); *H04N 9/3144* (2013.01)

(56) References Cited

U.S. PATENT DOCUMENTS

| | | | | |
|---|---|---|---|---|
| 2009/0284148 | A1* | 11/2009 | Iwanaga | G02B 26/008 313/506 |
| 2010/0149494 | A1 | 6/2010 | Kawachi et al. | |
| 2011/0032490 | A1* | 2/2011 | Hsiao | G03B 21/16 353/58 |
| 2011/0181193 | A1* | 7/2011 | Jorgensen | H01J 65/044 315/182 |
| 2011/0188008 | A1* | 8/2011 | Maeda | G03B 21/28 353/85 |
| 2011/0199580 | A1* | 8/2011 | Hirata | G03B 21/20 353/31 |
| 2012/0044693 | A1 | 2/2012 | Hatase | |
| 2012/0097376 | A1 | 4/2012 | Lin et al. | |
| 2012/0182527 | A1 | 7/2012 | Enomoto | |
| 2012/0229781 | A1 | 9/2012 | Jikuya et al. | |
| 2012/0275134 | A1 | 11/2012 | Takahashi et al. | |
| 2014/0340653 | A1* | 11/2014 | Chifu | G03B 21/16 353/61 |

FOREIGN PATENT DOCUMENTS

| | | |
|---|---|---|
| JP | 2008-52180 A | 3/2008 |
| JP | 2009-277516 A | 11/2009 |
| JP | 2011-75898 A | 4/2011 |
| JP | 2011-186350 A | 9/2011 |
| JP | 2012-13897 A | 1/2012 |
| JP | 2012-18762 A | 1/2012 |
| JP | 2012-68464 A | 4/2012 |
| JP | 2012-173593 A | 9/2012 |

OTHER PUBLICATIONS

Extended European Search Report dated Oct. 10, 2016 in Patent Application No. 14808163.1.
Combined Chinese Office Action and Search Report dated Jan. 4, 2017 in Patent Application No. 201480030503.1 (with English language translation).
Office Action dated Jan. 16, 2018 in corresponding Japanese Patent Application No. 2015-521271, 3 pages.
Office Action issued in corresponding Japanese Application No. 2018-171137 dated Aug. 20, 2019.
Office Action dated Nov. 19, 2019 in corresponding Japanese Patent Application No. 2018-171137, 4 pages.

* cited by examiner

LIGHT SOURCE APPARATUS AND IMAGE DISPLAY APPARATUS

CROSS-REFERENCE TO RELATED APPLICATIONS

This application is a continuation of U.S. application Ser. No. 15/613,917, filed Jun. 5, 2017, which is a continuation of U.S. application Ser. No. 14/784,081, filed Oct. 13, 2015, which is a national phase application of International Application No. PCT/JP2014/002408, filed May 2, 2014, and claims priority to Japanese Application No. 2013-119834, filed Jun. 6, 2013, the entire contents of which are incorporated herein by reference.

TECHNICAL FIELD

The present technology relates to a light source apparatus, and an image display apparatus using the light source apparatus.

BACKGROUND ART

In recent years, more and more products employ solid state light sources such as LEDs (Light Emitting Diode) and LDs (Laser Diode) instead of existing mercury lamps, xenon lamps, or the like, as light sources used for presentation or digital cinema projectors. A long-life fixed light source such as an LED does not need conventional replacement of lamps and lights up immediately at power-on, which are advantageous.

One type of such a projector employs a solid state light source as an excitation light source. A phosphor or the like is irradiated with light from a solid state light source as excitation light, and the phosphor or the like is used to display an image. For example, blue light, and red light and green light generated excited by the blue light as excitation light are used to display a color image.

For example, according to a light source apparatus of Patent Document 1, a phosphor wheel is irradiated with blue laser light as excitation light. The phosphor wheel includes a base and a phosphor layer formed thereon. The phosphor layer is irradiated with the excitation light, and yellow fluorescence is thus generated. The blue light and the yellow light emitted from the phosphor layer are synthesized, and white light is thus emitted (Patent Document 1, paragraphs [0028], [0029], etc.).

According to the disclosure of Patent Document 1, the phosphor wheel generates heat when it is irradiated with laser light. For example, if the phosphor wheel is irradiated with a larger amount of light to increase output of the light source apparatus, then the phosphor wheel generates a larger amount of heat. According to Patent Document 1, a predetermined position of the phosphor wheel is irradiated with excitation light while rotating the phosphor wheel to cool down the phosphor wheel. Further, by using a crystalline member such as crystal and sapphire having a higher thermal conductivity as the base of the phosphor wheel, cooling performance is increased (Patent Document 1, paragraphs [0005], [0006], etc.).

Patent Document 1: Japanese Patent Application Laid-open No. 2012-173593

SUMMARY OF INVENTION

Problem to be Solved by the Invention

As described above, when light emitted from a light emitting body such as a phosphor is used, it is important to cool down heat generated with irradiation with excitation light.

In view of the above-mentioned circumstances, it is an object of the present technology to provide a light source apparatus capable of efficiently cooling down a light emitting body, which generates heat when it is irradiated with excitation light, and an image display apparatus using the light source apparatus.

Means for Solving the Problem

To attain the above-mentioned object, according to an embodiment of the present technology, there is provided a light source apparatus including a light source section, a light outputting section, and a housing.

The light source section includes one or more solid state light sources capable of emitting light of a predetermined wavelength band as incident light.

The light outputting section includes a light emitting body configured to be excited by incident light from the light source section and to emit visible light having a wavelength band longer than a wavelength of the incident light, the light outputting section being capable of emitting synthetic light containing light having the predetermined wavelength band and visible light from the light emitting body.

The housing holds the light source section and the light outputting section, the housing including an inlet and an outlet formed not to face a light path of the incident light from the light source section to the light outputting section, and a space as a flow path of cooling airflow for cooling down the light outputting section, the cooling airflow being drawn into the inlet and exhausted from the outlet.

According to the light source apparatus, the housing, which holds the light source section and the light outputting section, includes the inlet, the outlet, and the space. The cooling airflow travels the space as the flow path from the inlet to the outlet, and thus cools down the light outputting section including the light emitting body. The inlet and the outlet are formed not to face the incident light from the light source section to the light outputting section. Accordingly it is possible to prevent the incident light from being leaked from the housing and to efficiently cool down the light outputting section.

The space may include a curving portion for curving a flow path of cooling airflow travelling the light outputting section from the inlet to the outlet.

As described above, by structuring the space such that the flow path of the cooling airflow is curved, it is possible to prevent the incident light from being leaked sufficiently.

The light outputting section may include a wheel supporting the light emitting body, a motor for rotating the wheel, and a lens for focusing the synthetic light. In this case, the inlet may be formed at such a position that the cooling airflow drawn into the inlet is sent to the wheel and the motor.

By forming the inlet at such a position, it is possible to efficiently cool down the wheel and the motor.

The housing may include a base and a chassis supported by the base. In this case, the light outputting section may be held by the base. Further, the inlet may be formed to face the light outputting section.

The base may have a planar shape, the base including a first edge portion and a second edge portion facing each other in a first direction. In this case, the chassis may include a side wall extending in a second direction and a cap covering the side wall, the second direction being perpendicular to a planar direction of the base. Further, the inlet may be formed at the base side of the housing. Further, the outlet may be formed at the cap side of the housing.

According to the light source apparatus, the inlet is formed at the base side, and the outlet is formed at the cap side. So the cooling airflow travels from the base to the cap in the second direction. As described above, the flow path of the cooling airflow may be set in the second direction.

The one or more solid state light sources may be arranged on the second edge portion such that the incident light is emitted toward the first edge portion side in the first direction as an optical-axis direction. In this case, the light outputting section may be arranged on the first edge portion such that the synthetic light is emitted in the direction the same as the optical-axis direction. Further, the inlet may be formed on the first edge portion of the base. Further, the outlet may be formed near the cap at the second edge portion side.

According to the light source apparatus, one or more solid state light sources are arranged on the second edge portion of the base, and the incident light is emitted in the first direction as the optical-axis direction. The inlet is formed on the first edge portion of the base, and the outlet is formed near the cap at the second edge portion side. So the cooling airflow travels from the inlet to the outlet passing through the light outputting section in the second direction perpendicular to the optical-axis direction. By setting the flow path in the direction perpendicular to the optical-axis direction, it is possible to prevent the incident light from being leaked sufficiently.

The space may have a light-attenuation path having a predetermined length formed toward the outlet.

By forming such a light-attenuation path, even if the incident light is leaked from the outlet, the light-attenuation portion is capable of sufficiently reducing the energy of the light.

The chassis may include a plurality of frame members arranged such that an overlapped portion is formed, adjacent portions of members overlapping with each other in the overlapped portion.

As described above, because the plurality of frame members are arranged such that the overlapped portion is formed, it is possible to prevent the incident light from being leaked sufficiently. Further, by using the plurality of frame members, it is possible to structure the housing inexpensively and easily.

The light-attenuation path may be structured by a plurality of frame members arranged such that an overlapped portion is formed, adjacent portions of members as the chassis overlapping with each other in the overlapped portion.

As described above, the light-attenuation portion in the space may be structured by assembling the plurality of frame members. Accordingly it is possible to form the light-attenuation portion easily.

The plurality of frame members may be mounted one by one starting from the base and are thus assembled such that the plurality of frame members are not disassembled when the cap is fixed.

Accordingly it is possible to realize the housing, which is not disassembled easily.

The cap may be fixed by a fixing member, a fixing status of the fixing member being capable of being released by using a dedicated releasing member.

Accordingly it is possible to sufficiently prevent the housing from being disassembled easily.

The light source apparatus may further include an airflow-sender for sending the cooling airflow into the inlet.

Accordingly it is possible to sufficiently cool down the light outputting section.

According to an embodiment of the present technology, there is provided an image display apparatus including the light source apparatus, an image-generating system, and a projecting system.

The image-generating system includes an image-generating device configured to generate an image with light, the image-generating device being irradiated with the light, and a lighting optical system configured to irradiate the image-generating device with incident light from the light source apparatus.

The projecting system is configured to project an image generated by the image-generating device.

Effect of the Invention

As described above, according to the present technology, is possible to efficiently cool down a light emitting body, which generates heat when it is irradiated with excitation light.

MODES FOR CARRYING OUT THE INVENTION

Hereinafter, embodiments of the present technology will be described with reference to the drawings.

[Light Source Apparatus]

Figure 1:
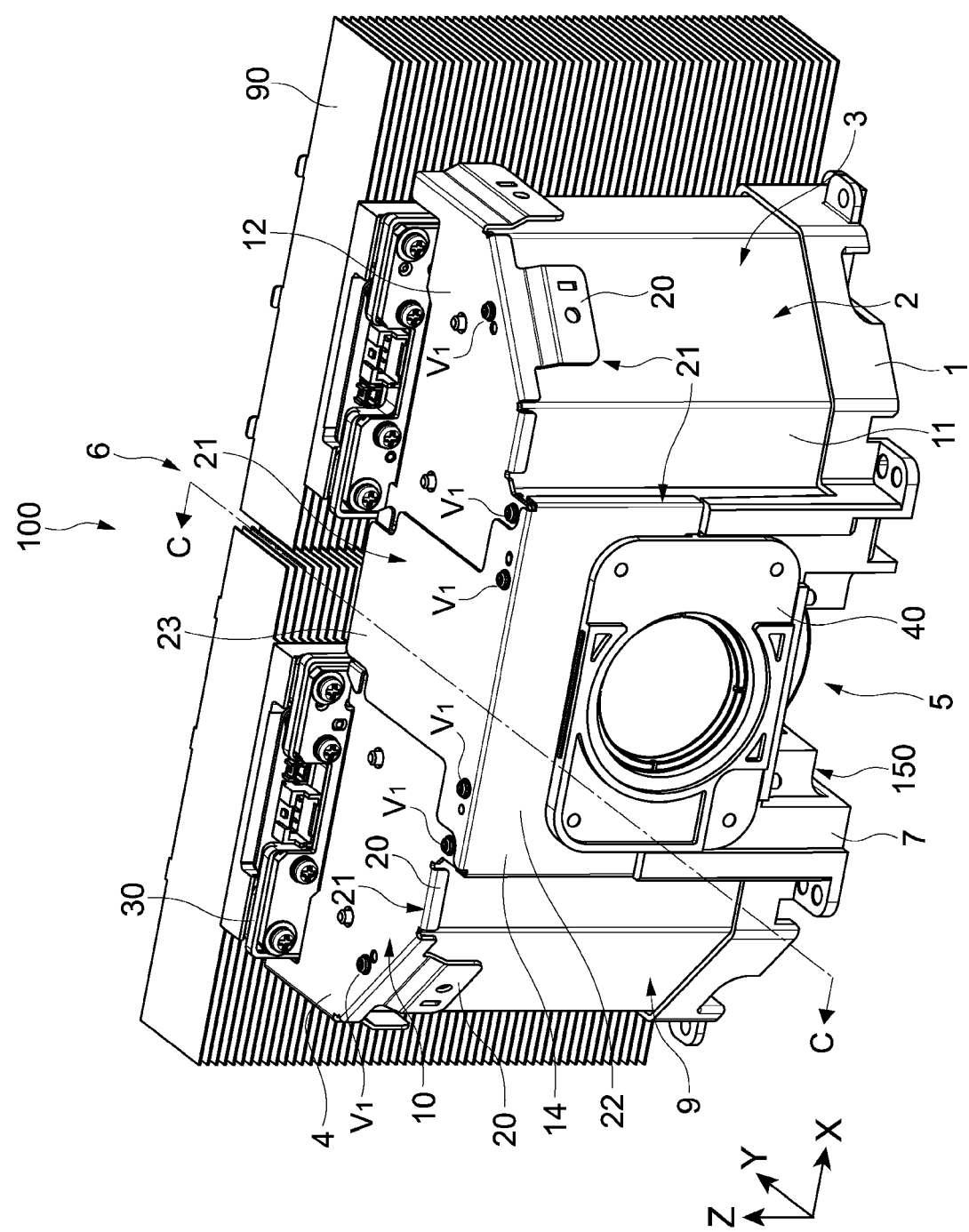
FIG. 1 A perspective view showing the basic structure of the light source apparatus of an embodiment of the present technology.
Figure 2:
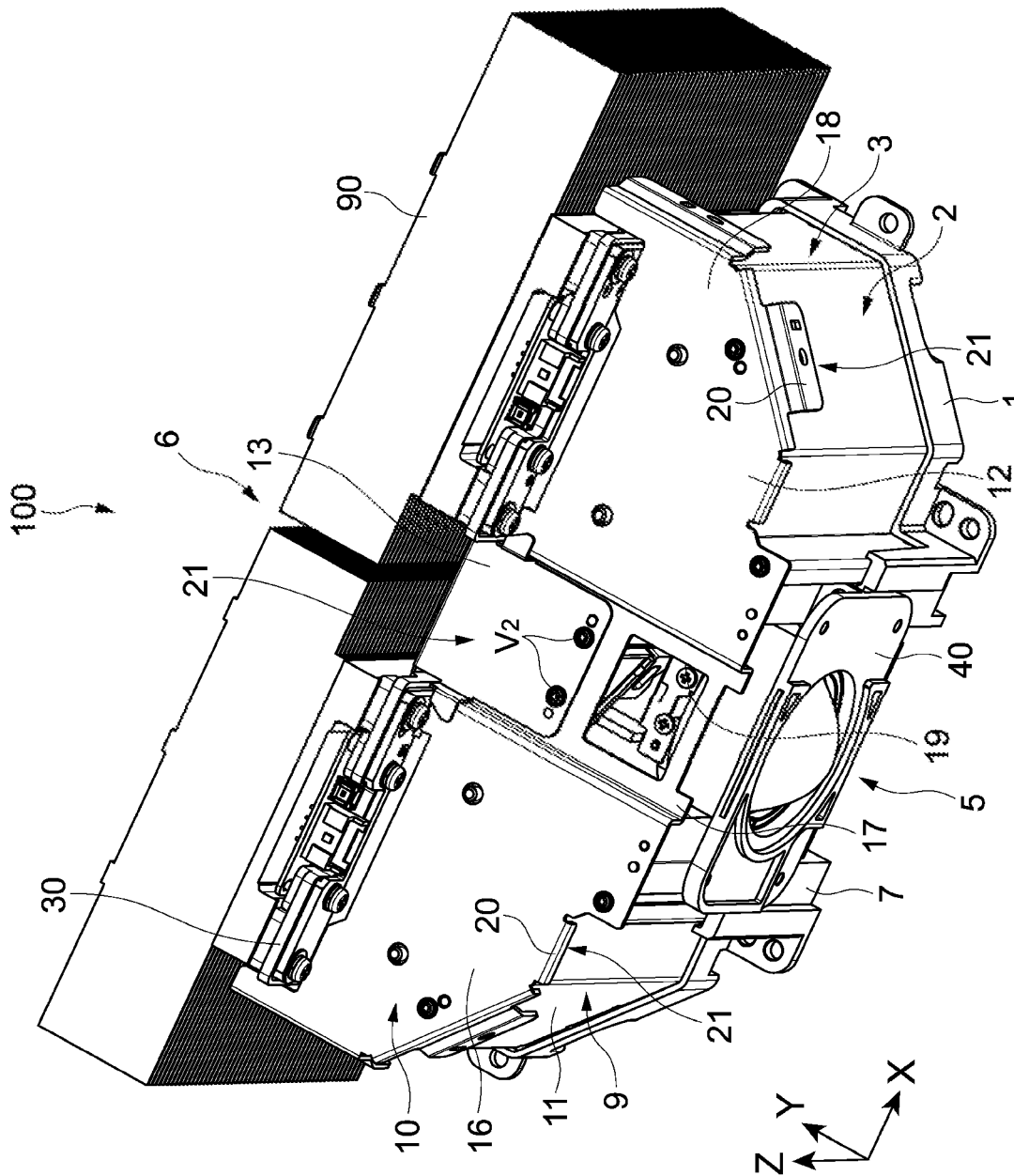
FIG. 2 A diagram showing the light source apparatus of FIG. 1 from which the front member is removed.
Figure 3:
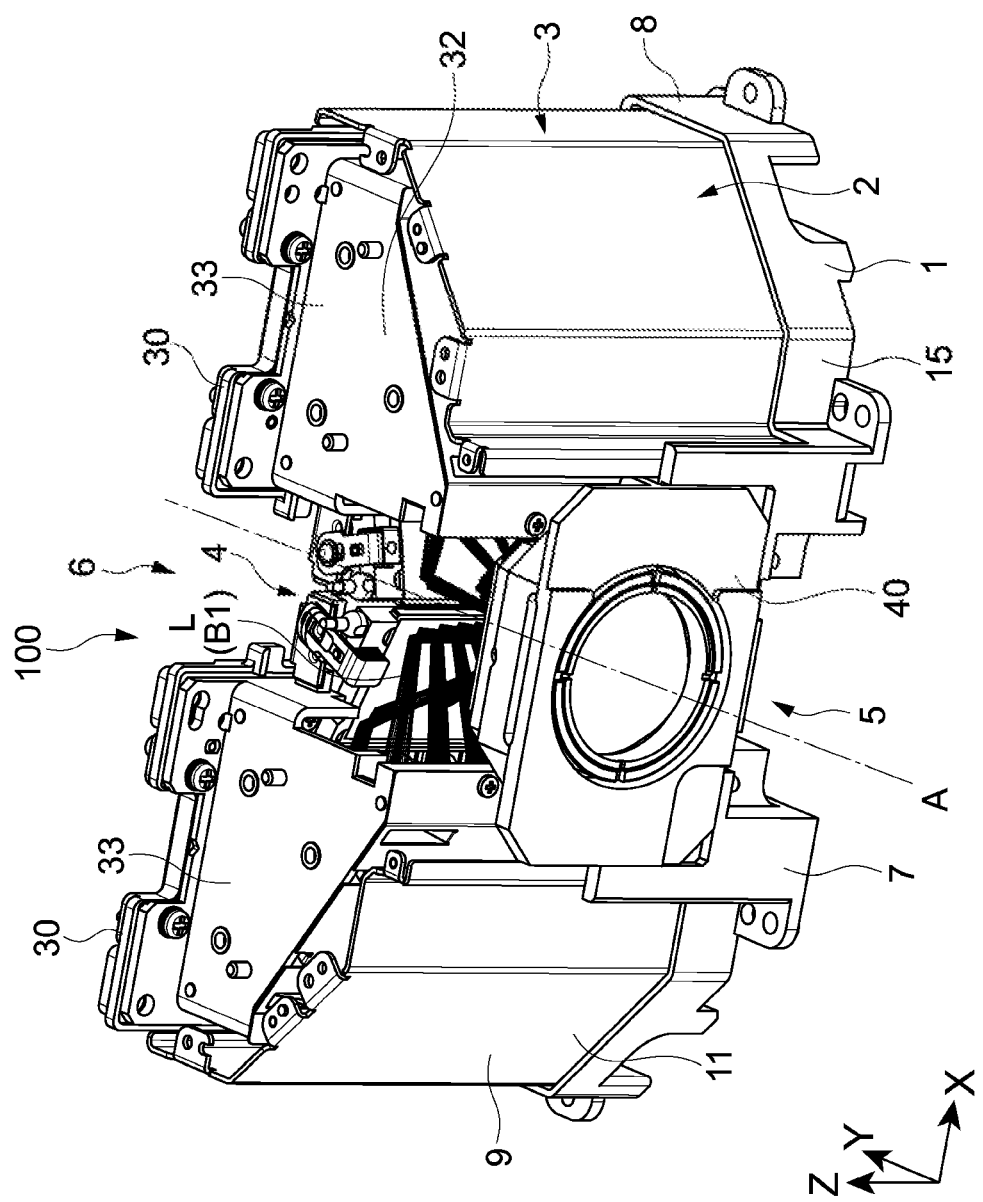
FIG. 3 A diagram showing the light source apparatus of FIG. 2 from which the rear member and the cap member are removed.

FIG. 1 is a perspective view showing the basic structure of the light source apparatus 100 of an embodiment of the present technology. FIG. 2 is a diagram showing the light source apparatus 100 of FIG. 1 from which the front member 14 is removed. FIG. 3 is a diagram showing the light source apparatus 100 of FIG. 2 from which the rear member 13 and the cap member 12 are removed. FIG. 3 does not show the heatsink 90 of FIG. 1 and FIG. 2.

The light source apparatus 100 is a light source apparatus for a projector configured to synthesize laser light of a blue wavelength band and light of a red wavelength band to a green wavelength band, which is generated from fluorescent materials excited by the laser lights, and to emit white light. In this embodiment, the white light corresponds to synthetic light.

As shown in FIG. 1, the light source apparatus 100 includes the base 1 provided at the bottom, and the chassis 2 supported by the base 1. The housing 3 in this embodiment includes the base 1 and the chassis 2. The housing 3 holds the light source section 30 having one or more solid state light sources, and the phosphor unit 40 configured to receive light from the light source section 30, to generate white light, and to emit the white light. As shown in FIG. 3, in the space 4 in the housing 3, the phosphor unit 40 is irradiated with the incident light L from the light source section 30.

The base 1 has a planar shape, and has an elongated shape extending in one direction. The longer direction, i.e., the extending direction of the elongated base 1, is the lateral direction of the light source apparatus 100, and the shorter direction perpendicular to the longer direction is the front-back direction. In short, one of the two longer portions facing each other in the shorter direction is the front side 5, and the other is the back side 6. The portion of the base 1 at the front side 5 is the first edge portion 7, and the portion at the back side 6 is the second edge portion 8. They face each other in the front-back direction.

The direction perpendicular to both the longer direction and the shorter direction is the height direction of the light source apparatus 100. In the example of FIG. 1, the x-axis, y-axis, and z-axis directions are the lateral direction, the front-back direction, and the height direction, respectively. Above all, the front-back direction and the height direction correspond to the first direction and the second direction in this embodiment, respectively. Further, the xy-plane direction corresponds to the planar direction of the base 1.

The chassis 2 includes the side wall 9 extending in the height direction perpendicular to the planar direction of the base 1, and the cap 10 that covers the side wall 9. In this embodiment, the two side wall members 11, the cap member 12, the rear member 13, and the front member 14 constitute the housing 3 including the side wall 9 and the cap 10. As shown in FIG. 3, the two side wall members 11 are mounted on the base 1. The side wall members 11 are engaged with the inner sides of the wall portions 15 formed on rim portions of the base 1, and mounted.

The cap member 12 is mounted on the tops of the two side wall members 11. As shown in FIG. 2, the cap member 12 includes the right cover 16, the center portion 17, and the left cover 18. The right cover 16 and the left cover 18 cover the two side wall members 11, respectively, and are symmetric. Their shapes are approximately the same as the shapes of the rim portions of the base 1. The center portion 17 couples the right and left covers 16 and 18. The center portion 17 is a concave, and includes the opening 19 at the front side. The opening 19 is approximately above the phosphor unit 40 held by the first edge portion 7 of the base 1.

The bent portions 20, which are extended downward in the height direction, are formed on the rim portions of the right and left covers 16 and 18. The bent portions 20 are formed approximately on the entire rim portions of the right and left covers 16 and 18. The bent portions 20 are overlapped on the outer portions of the side wall members 11, and the cap member 12 is thus mounted. In other words, when the two side wall members 11 and the cap member 12 are arranged, the overlapped portions 21 are formed, in which those portions are overlapped with each other in the two adjacent portions. The overlapped portion 21 is a portion in which a part of one member is overlapped with a part of the adjacent member. Here, an upper portion of the side wall member 11 and the bent portion 20 of the cap member 12 form the overlapped portions 21.

As shown in FIG. 2, the rear member 13 is mounted such that the rear member 13 and the back side of the center portion 17 of the cap member 12 form the overlapped portion 21. The rear member 13 is arranged such that the rear member 13 covers the space between the two light source sections 30 arranged on the second edge portion 9 of the base 1. The rear member 13 is arranged such that the rear member 13 is overlapped with a back side portion of the opening 19 formed in the center portion 17 of the cap member 12.

As shown in FIG. 1, the front member 14 is mounted at the end. The front member 14 includes the front surface 22 and the top surface 23, and is mounted above the first edge portion 7 side of the base 1. The front member 14 is arranged such that the phosphor unit 40, which is arranged on the first edge portion 7, is interposed between the first edge portion 7 and the front surface 22, which comes from above. At this time, the top surface 23 of the front member 14 is arranged such that it covers the entire center portion 17 of the cap member 12. In other words, the top surface 23 of the front member 14 also covers a portion of the rear member 13, which is overlapped with the center portion 17. The two side walls 11 and the front surface 22 form the overlapped portions 21. Further, the top surface 23, and the center portion 17, and the rear member 15 form the overlapped portion 21.

As described above, according to this embodiment, a plurality of frame members including the two side wall members 11, the cap member 12, the rear member 13, and the front member 14 constitute the chassis 2. The plurality of frame members are assembled such that the overlapped portions 21 are formed in the adjacent portions. As a result, it is possible to sufficiently suppress leakage of incident light traveling from the light source section 30 to the phosphor unit 40 and its reflected light to the outside of the chassis 2. In other words, it is possible to improve the light-blocking effect of the chassis 2. Further, compared to an integrally-formed chassis 2, for example, it is possible to prepare the frame members by processing inexpensive metal plates and the like, and to assemble the inexpensive chassis 2 easily.

The shapes, sizes, and the like of the overlapped portions 21 are not limited. They may be arranged such that at least adjacent members are overlapped with each other. If the overlapped portions 21 are formed on the entire adjacent portions, the light-blocking effect is kept high. However, some portions may not be overlapped partly depending on design constraint and the like. Further, light may likely to leak from the positions of the light source section 30 and the phosphor unit 40 in the housing 3 and the position of the light path of incident light. By making the overlapped portions 21 larger near such positions, it is possible to improve the light-blocking effect.

For example, adjacent members may be arranged such that they are overlapped with each other, they may not directly contact each other, and a space may be formed therebetween. In this case, also, if the size of the overlapped area is sufficient, then it is possible to suppress leakage of light. The space between the members may be used as a flow path for cooling airflow described below. As described above, members, which are arranged such that they are overlapped with each other and do not directly contact each other, may form the overlapped portion 21.

Further, since the plurality of frame members form the chassis 2, it is possible to easily realize the cooling structure described below.

The plurality of frame members are mounted one by one starting from the base 1. Further, when the cap member 12 and the front member 14 constituting the cap 10 are fixed, they are assembled such that the cap 10 is not disassembled. Accordingly, it is not possible to remove middle members such as, for example, the side wall members 11 when the cap member 12 and the front member 14 are fixed. As a result, it is possible to realize the housing 3, which may not be disassembled easily, and it is possible to realize the highly-safe light source apparatus 100, which is capable of preventing human body and the like from being irradiated and the like with laser light. Further, it is possible to realize the structure in which fastening members such as screws and screw nails and other fixing members are only used to fix the front member 14 and the cap member 12, and it is not necessary to use them to fix the other members. As a result, it is possible to reduce the number of necessary fixing members, and it is possible to reduce the costs for components.

As shown in FIG. 1, special screws are used as the fixing members V1 for fixing the front member 14 and the cap member 12. The special screw means a fixing member whose fixing status can be released by using a dedicated releasing member. For example, a screw having a head with a hole of a special shape is used. Examples of the special shape include polygon shapes having a larger number of corners such as an octagon and a heptagon, a star shape having pointed convexes and round concaves, and the like. It is necessary to prepare a dedicated releasing member corresponding to the shape of the hole of such a fixing member. The shape of the hole is not limited or the shape of the hole of the head may not be special as long as the fixing member has a special structure, which cannot be released by using a common releasing member such as a screwdriver and a wrench.

As shown in FIG. 2, the rear member 13 is fixed on the center portion 17 of the cap member 12 by using the fixing members V2. Special screws may be used as the fixing members V2. Meanwhile, because this portion is covered by the front member 14 and a user cannot directly touch this portion, fixing members such as common screws may be used here. In other words, special fixing members such as special screws may be used as at least fixing members, which can be touched directly and are mounted on positions at which the housing 3 is opened/closed. Accordingly, it is possible to sufficiently prevent the housing 3 from being disassembled easily.

As shown in FIG. 3, the two light source sections 30 are arranged on the second edge portion 8 of the base 1 such that they are aligned in the longer direction. The light source section 30 includes, as one or more fixed light sources, the plurality of laser light sources 31 capable of emitting the blue laser light B1 (see FIG. 4). The plurality of laser light sources 31 are arranged on the second edge portion 8 such that they emit the blue laser light B1 toward the first edge portion 7 side in the optical-axis direction, i.e., the front-back direction as the first direction.

Light-collection optical systems are arranged in front of the two light source sections 30, respectively. The light-collection optical system focuses the blue laser light B1 from the plurality of laser light sources 31 on a predetermined point of the phosphor unit 40. FIG. 3 shows the support 32 in front of the light source section 30. The support 32 supports the light source section 30 and the light-collection optical system as one unit. Thanks to the supports 32, the light-collection unit 33 including the light source section 30 and the light-collection optical system is formed.

The phosphor unit 40 emits white light along the optical axis A, where the blue laser light B1 focused by the light-collection units 33 is the excitation light. The direction of the optical axis A of the white light is the same as the direction of the optical-axis direction of the blue laser light B1 from the plurality of laser light sources 31. In other words, the phosphor unit 40 is arranged on the first edge portion 7 such that the phosphor unit 40 emits white light in the direction the same as the optical-axis direction of the blue laser light B1.

Figure 4:
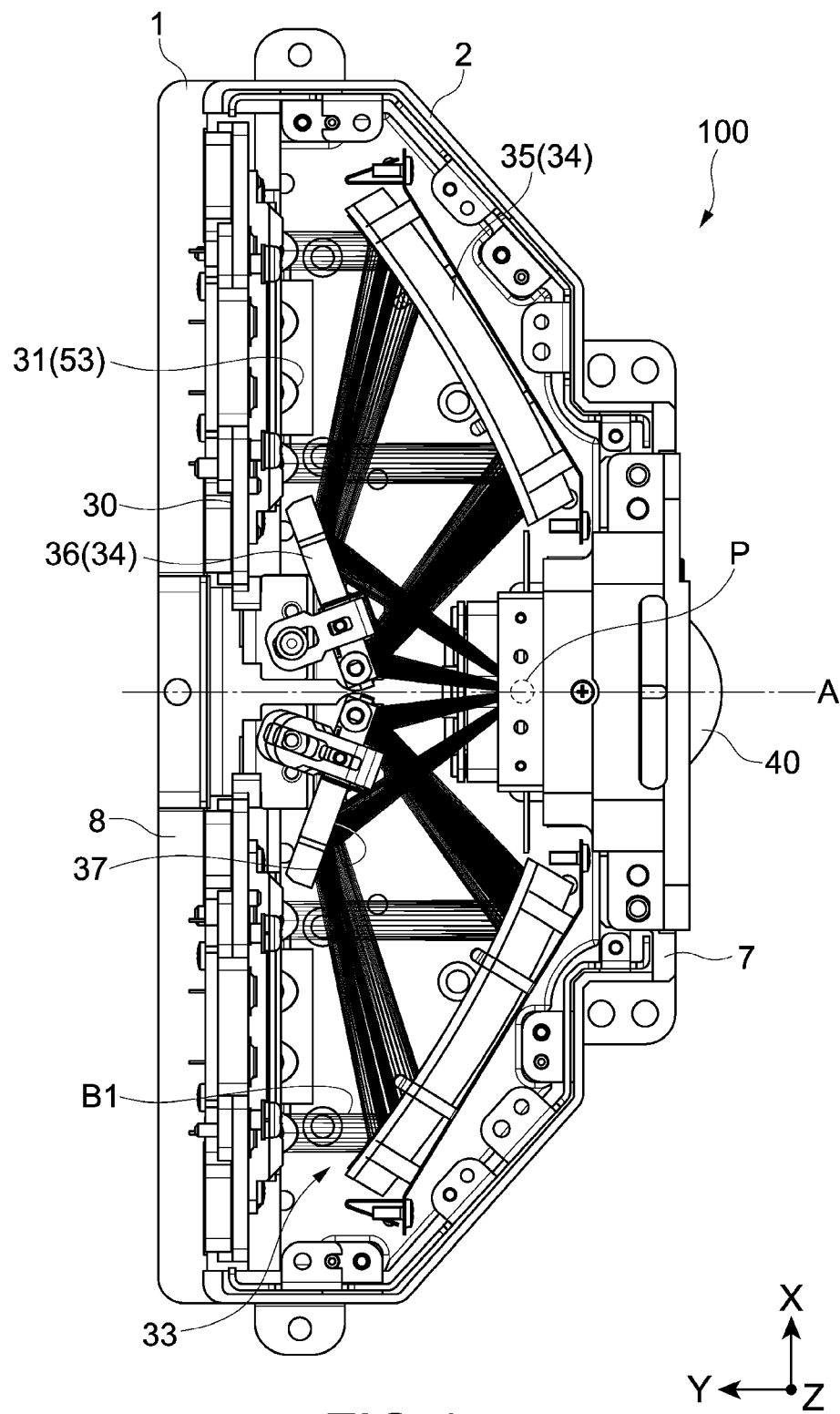
FIG. 4 A plan view showing the light source apparatus of FIG. 3 seen from the above.
Figure 5:
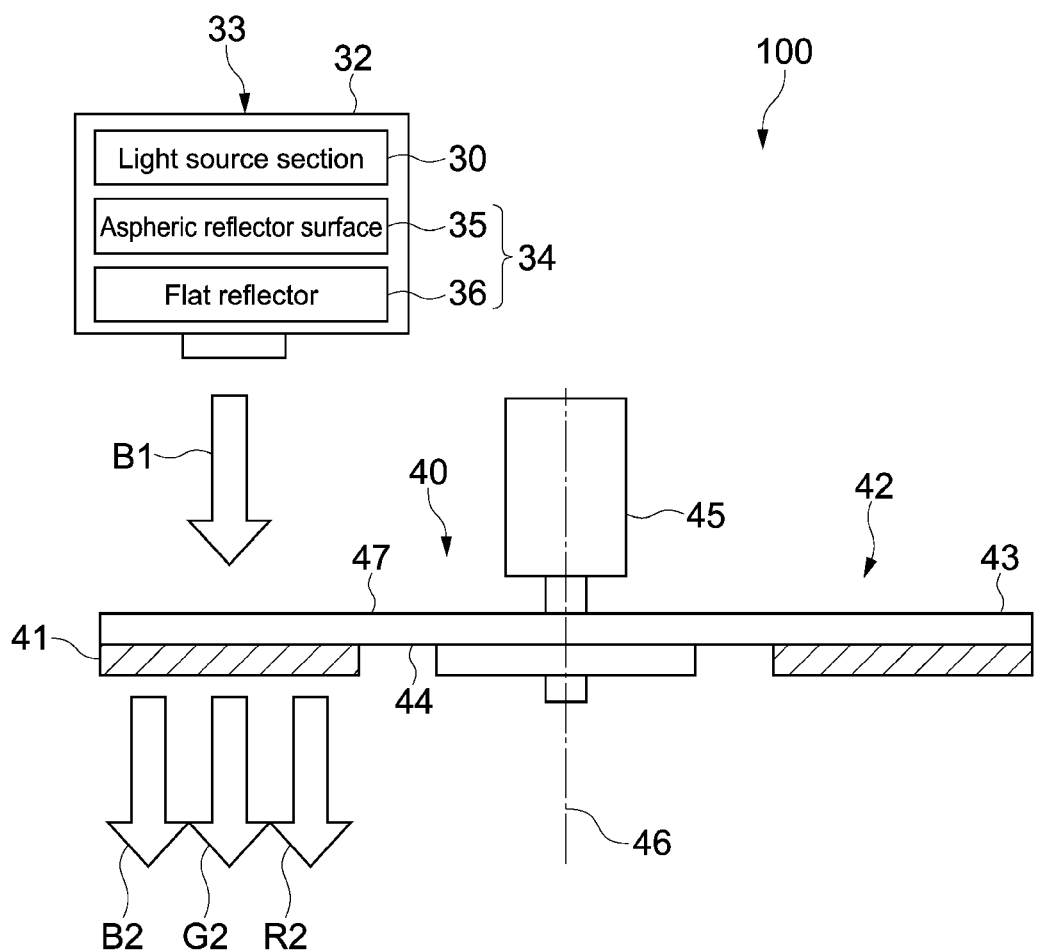
FIG. 5 A structural diagram schematically illustrating how the light source apparatus emits light.

FIG. 4 is a plan view showing the light source apparatus 100 of FIG. 3 seen from the above. FIG. 4 omits to show the supports 32. FIG. 5 is a structural diagram schematically illustrating how the light source apparatus 100 emits light.

The light-collection unit 33 includes: the light source section 30 including the plurality of laser light sources 31; the light-collection optical system 34 configured to focus the blue laser light B1, i.e., incident light from the plurality of laser light sources 31, on the predetermined point P; and the support 32 supporting the light source section 30 and the light-collection optical system 34 as one unit.

Each of the plurality of laser light sources 31 is a blue laser light source capable of oscillating the blue laser light B1, which has the peak wavelength of emission intensity in the wavelength range of 400 nm to 500 nm, for example. The plurality of laser light sources 31 correspond to one or more solid state light sources capable of emitting light having a predetermined wavelength band as incident light. Other light sources such as LEDs may be used as the solid state light sources. Further, the light having a predetermined wavelength band may not be limited to the blue laser light B1.

The light-collection optical system 34 focuses the blue laser light B1 emitted from the plurality of laser light sources 31 on the phosphor 41 from the back side of the phosphor unit 40. The light-collection optical system 34 in this embodiment includes the aspheric reflector surface 35 and the flat reflector 36. The aspheric reflector surface 35 reflects and collects incident light from the plurality of laser light sources 31.

The flat reflector 36 reflects light from the plurality of laser light sources 31, which is reflected by the aspheric reflector surface 35, to the phosphor 41. The flat reflector 36 includes the flat reflector surface 37 as a reflector surface that reflects light from the plurality of laser light sources 31, and reflects light to the phosphor 41 by using the flat reflector surface 37. As a result, the blue laser light B1 from the plurality of laser light sources 31 is focused on the predetermined point P on the phosphor 41 of the phosphor unit 40.

The above-mentioned support 32 supports the light source section 30, the aspheric reflector surface 35, and the flat reflector 36 as one unit.

The phosphor unit 40 includes the phosphor wheel 42 inside as shown in FIG. 5. The phosphor wheel 42 includes the disk-shaped substrate 43, which transmits the blue laser light B1, and the phosphor layer 41 arranged on the layout surface 44 of the substrate 43. The motor 45 configured to drive the phosphor wheel 42 is connected to the center of the substrate 43, the phosphor wheel 42 has the rotary shaft 46 along the normal line passing the center of the substrate 43, and the phosphor wheel 42 is capable of rotating the rotary shaft 46 being the center.

The rotary shaft 46 of the phosphor wheel 42 is provided such that its elongated direction is the same as the direction of the optical axis A, which passes through the approximate center of the phosphor unit 40. Further, the rotary shaft 46 is arranged at a position different from that of the optical axis A such that the predetermined point P of the phosphor layer 41 is at the approximate center (on the optical axis A) of the phosphor unit 40. As shown in FIG. 4, the light-collection unit 33 focuses the blue laser light B1 on the predetermined point P at the approximate center of the phosphor unit 40.

As shown in FIG. 5, the phosphor wheel 42 is arranged such that one main surface 47 on which the phosphor layer 41 is not provided, out of the two main surfaces of the substrate 43, faces the light-collection unit 33 side. Further, the phosphor wheel 42 is arranged such that the focal position of the blue laser light B1 focused by the light-collection unit 33 is the same as a predetermined point on the phosphor layer 41.

The phosphor layer 41 corresponds to a light emitting body, which is excited by light from the plurality of laser light sources 31 and emits visible light having a wavelength band longer than the wavelength of the light. In this embodiment, the phosphor layer 41 contains fluorescent materials, which is excited by the blue laser light B1 whose center wavelength is about 445 nm and emits fluorescence. Further, the phosphor layer 41 converts part of the blue laser light B1 emitted from the plurality of laser light sources 31 into light (i.e., yellow light) having wavelength bands including the red wavelength band to the green wavelength band, and emits the light.

As the fluorescent materials contained in the phosphor layer 41, YAG (yttrium, aluminum, garnet) phosphors are used, for example. Note that the kind of fluorescent materials, the wavelength band of excitation light, and the wavelength band of visible light generated as the result of excitation are not limited.

Further, while the phosphor layer 41 absorbs part of excitation light, the phosphor layer 41 transmits part of the excitation light. As a result, the phosphor layer 41 is also capable of emitting the blue laser light B1 emitted from the plurality of laser light sources 31. As a result, the phosphor layer 41 emits white light, which is the mixture of blue excitation light and yellow fluorescence. Since the phosphor layer 41 transmits part of excitation light, the phosphor layer 41 may contain filler particles, which are particle-type substance having optical transparency, for example.

When the motor 45 rotates the substrate 43, the laser light sources 31 irradiate the phosphor layer 41 with excitation light while the irradiate position on the phosphor layer 41 is moved relatively. As a result, the phosphor unit 40 emits white light, which contains the blue laser light B2 passing through the phosphor layer 41 and the green light G2 and the red light R2 being visible light from the phosphor layer 41, as synthetic light. Because the phosphor wheel 42 rotates, it is possible to prevent deterioration from being generated, which results from irradiation of one position on the phosphor layer 41 with excitation light for a longer period of time.

The phosphor unit 40 corresponds to a light outputting section in this embodiment. Note that the structure of the phosphor unit 40 is not limited, and the phosphor wheel 42 may not be used, for example. For example, another holder may hold the phosphor layer 41, and blue laser light from the light-collection units 33 may be focused thereon. In this case, also, the below-described cooling structure is capable of cooling the phosphor layer 41 and its holder down sufficiently.

Figure 6:
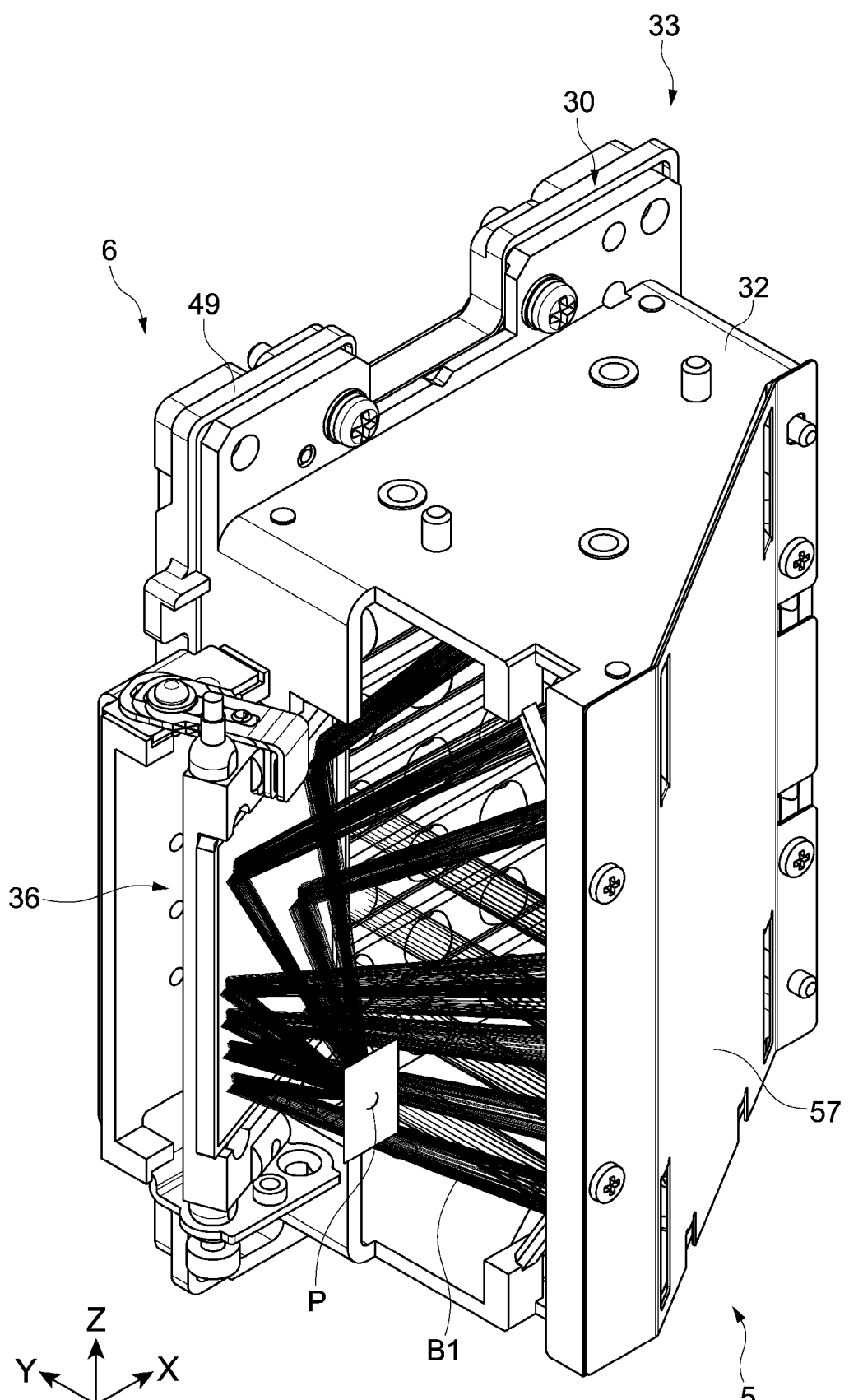
FIG. 6 A perspective view showing a structural example of the light-collection units.
Figure 7:
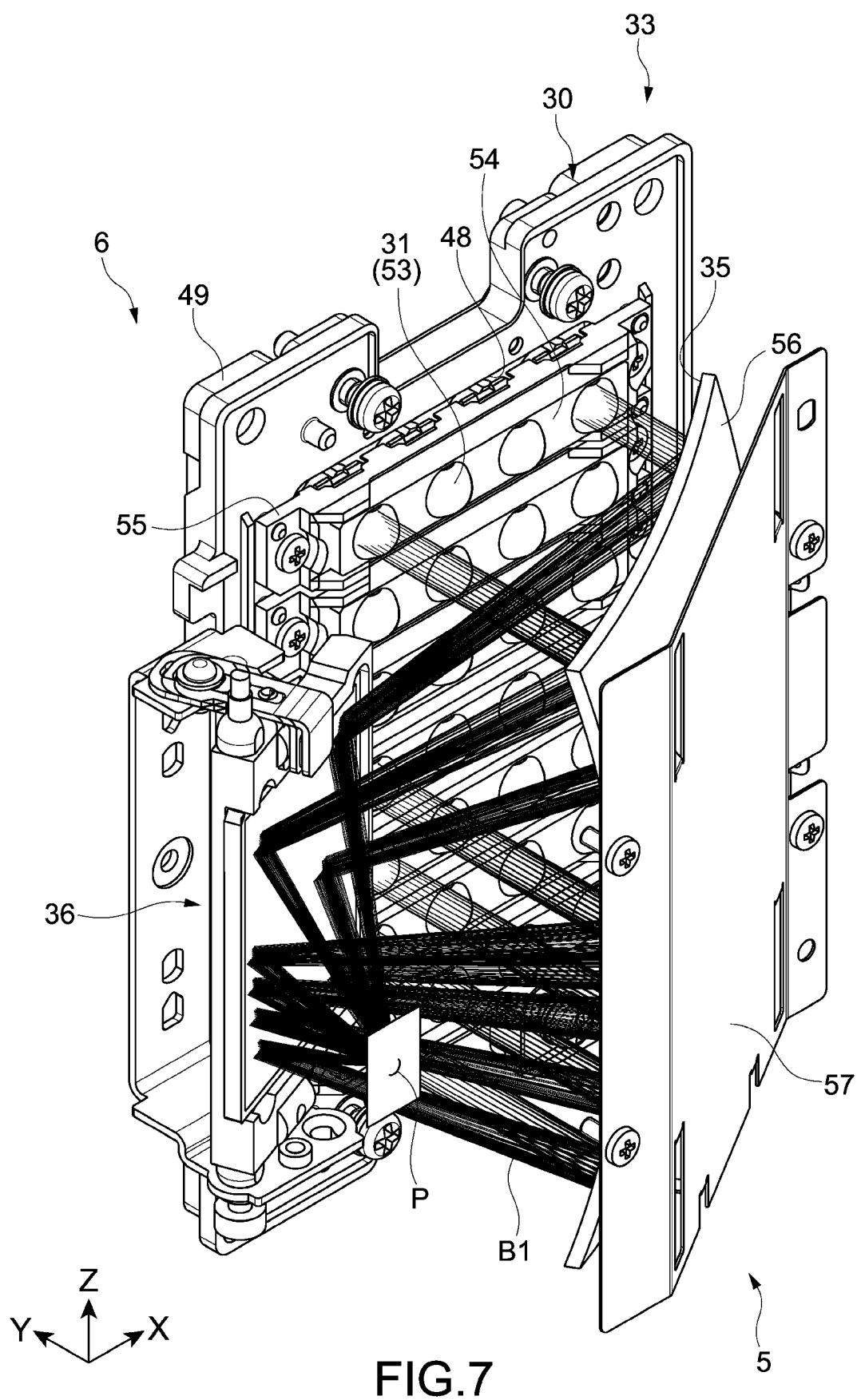
FIG. 7 A perspective view showing a structural example of the light-collection units.
Figure 8:
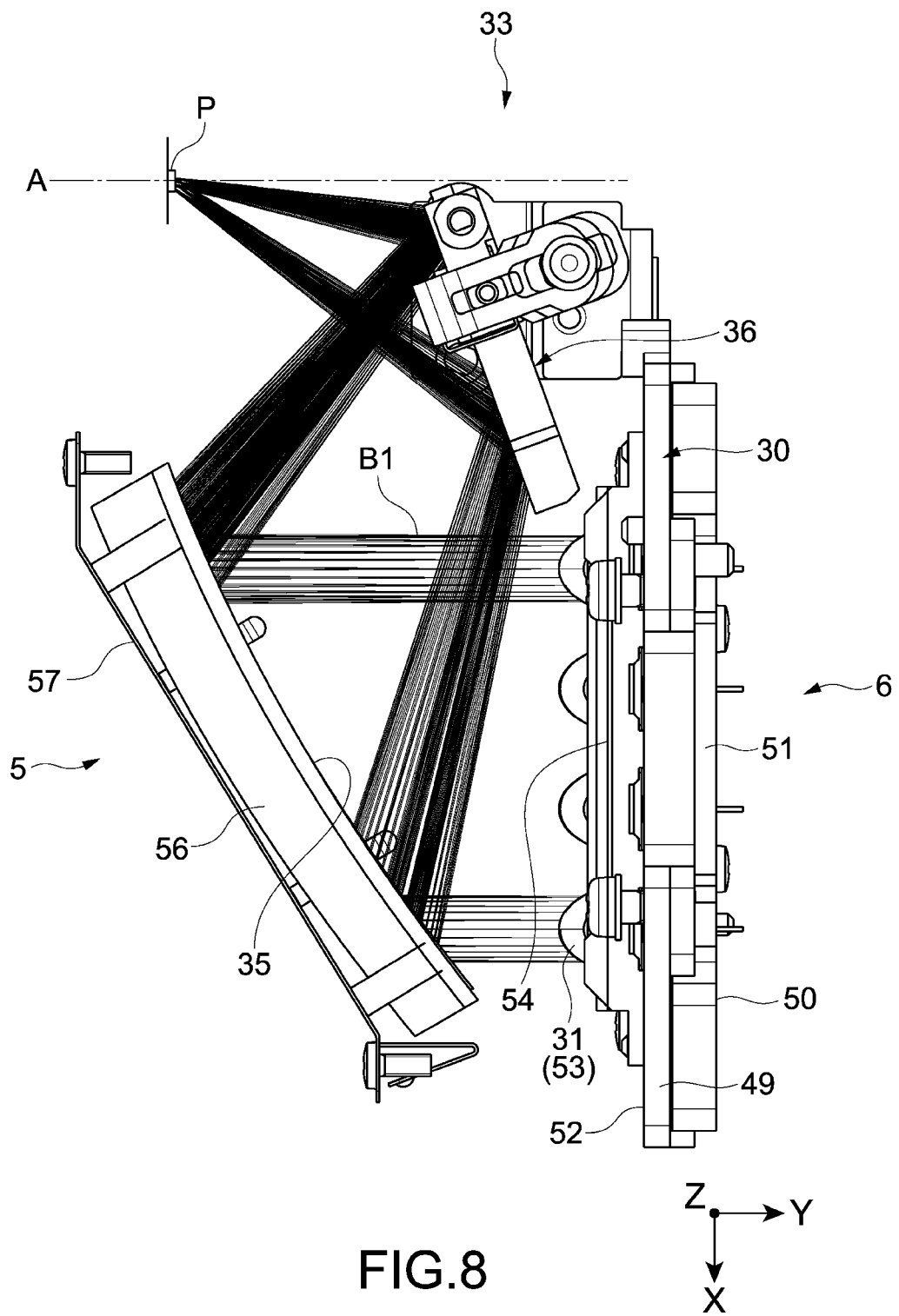
FIG. 8 A plan view showing the light-collection units of FIG. 7 seen from the above.

Each of FIG. 6 and FIG. 7 is a perspective view showing a structural example of the light-collection units 33. FIG. 7 omits to show the supports 32. FIG. 8 is a plan view showing the light-collection units 33 of FIG. 7 seen from the above.

As described above, the light-collection unit 33 includes the light source section 30, the aspheric reflector surface 35, the flat reflector 36, and the support 32 supporting them as one unit. The shape and size of the support 32 are not limited as long as the support 32 is capable of supporting them as one unit. Typically, the case-type support 32 is used such that the blue laser light B1 is not leaked to the outside. Therefore the use efficiency of the blue laser light B1 is increased.

As shown in FIG. 7, in this embodiment, a laser light source array including twenty-eight laser light sources 31 is used as the light source section 30. The light source section 30 includes the plate-type frame 49 including the openings 48. The mounting substrate 51, on which the plurality of laser light sources 31 are mounted, is arranged on the back surface 50 (surface of the back side 6) of the frame 49. The plurality of laser light sources 31 emit the blue laser light B1 in the direction the same as the optical-axis direction of the optical axis A toward the front side 5 through the openings 48 of the frame 49. The laser light sources 31 are arranged 4×7 (lateral direction (x-axis direction)×height direction (z-axis direction) of light source apparatus 100).

The twenty-eight collimator lenses 53 are arranged on the front surface 52 (surface at the front side 5) of the frame 49 corresponding to the positions of the plurality of laser light sources 31. The collimator lenses 53 are rotationally-symmetric aspheric lenses, and make the blue laser light B1 emitted from the laser light sources 31 approximately-parallel fluxes. In this embodiment, the lens units 54 are used, and each lens unit 54 integrally includes four collimator lenses 53 aligned in a straight line. Seven lens units 54 are aligned in the height direction. The holders 55 hold the lens units 54 and are fixed on the frame 49. Note that, with reference to the drawings, the collimator lenses 53 will be referred to as the laser light sources 31.

The structure of the light source section 30 is not limited, and the frame 49 may not be used, for example. The number of the laser light sources 31, how they are aligned, the structures of the collimator lenses 53, and the like are not limited. For example, the lens units 54 may not be used, and a collimator lens may be arranged for each laser light source 31. Alternatively, one collimator lens may bundle the fluxes from the plurality of laser light sources 31 to obtain an approximately-parallel flux. Note that part of fluxes of the blue laser light B1 emitted from the plurality of laser light sources 31 (the collimator lenses 53) is shown in the drawings.

The reflector 56 including the aspheric reflector surface 35 is arranged at the front side 5 of the plurality of laser light sources 31. The reflector 56 is arranged such that the aspheric reflector surface 35 faces the plurality of laser light sources 31. The aspheric reflector surface 35 is arranged such that it is oblique to the planar direction (xz-plane direction) of the layout surface 52 on which the plurality of laser light sources 31 are arranged. With this structure, the blue laser light B1 is reflected toward the flat reflector 36. A reflector mirror is used as the reflector 56, for example.

Typically, the aspheric reflector surface 35 is a specular concave reflector surface, and its shape is designed such that it is capable of reflecting the blue laser light B1 from the plurality of laser light sources 31 to be collected. Further, the aspheric reflector surface 35 may be a rotationally-symmetric aspheric or may be a free-form surface having no rotationally-symmetric axis. The shape of the aspheric reflector surface 35 is determined arbitrarily based on the positions of the plurality of laser light sources 31, the light-reflection direction, the light-collecting position, the size and the incident angle of the flux of the laser light B1 entering the aspheric reflector surface 35, and the like. The material of the reflector 56 is not limited, and is made of a metal material, glass, or the like, for example.

The outer shape and the size of the reflector 56 may be determined arbitrarily depending on the size of the area irradiated with the blue laser light B1. For example, a substantially-rectangular reflector 56, a triangle reflector 56, or a reflector 56 having another polygon shape, or the like may be used. According to this structure, it is possible to arbitrarily adjust the outer shape of the reflector 56 more easily and to make it smaller than the case where a condenser lens is used to collect light from the plurality of laser light sources 31 and the like. As a result, the light-collection optical system 34 may be downsized, and it is possible to prevent the light source apparatus 100 from being upsized.

As shown in FIG. 8, the support member 57 supports the reflector 56. As shown in FIG. 6, the support member 57 is fixed to the support 32 with screws. With this structure, the reflector 56 is supported by the support 32.

Figure 9:
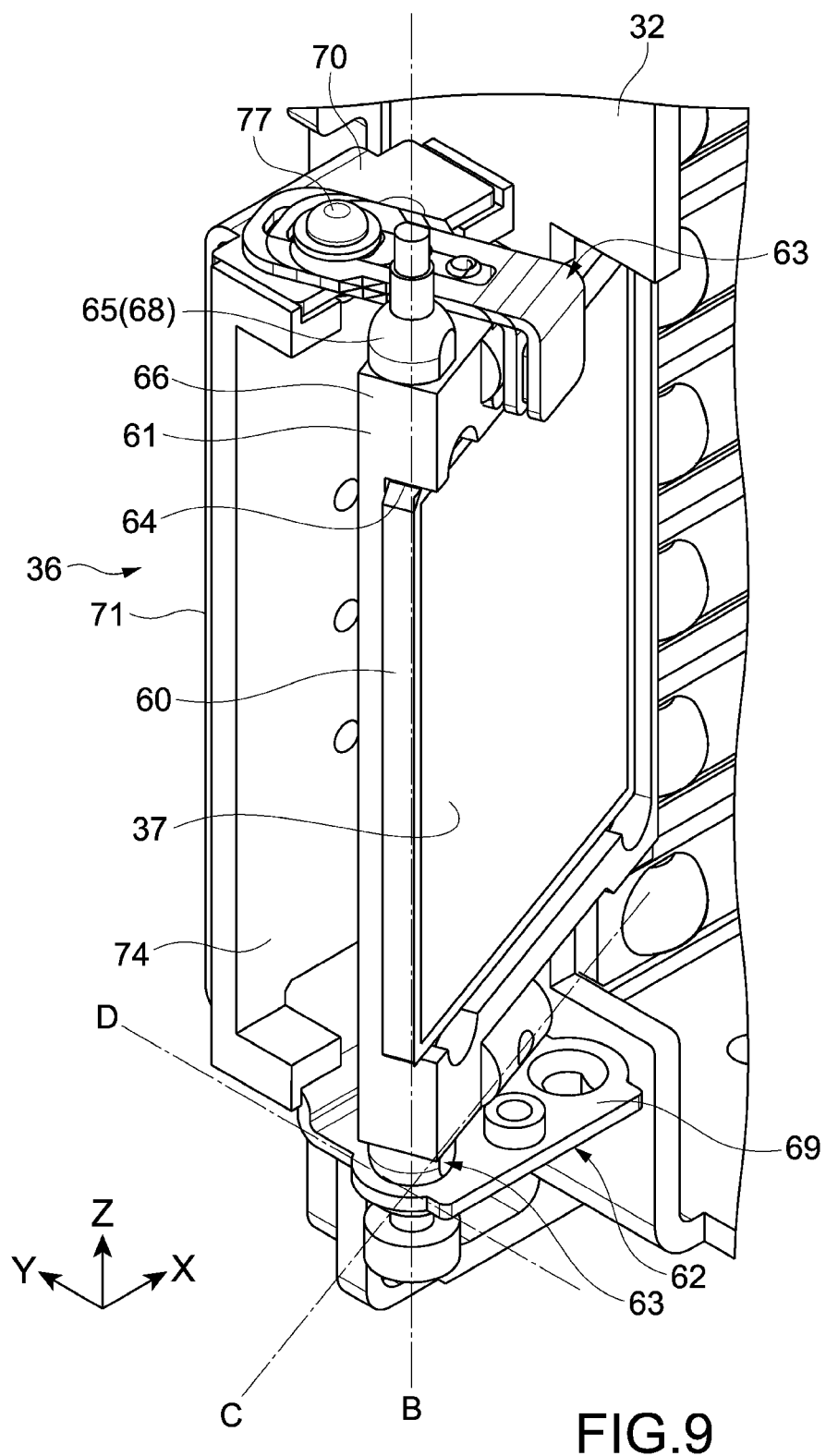
FIG. 9 An enlarged view showing the enlarged flat reflector supported by the support.

FIG. 9 is an enlarged view showing the enlarged flat reflector 36 supported by the support 32. The flat reflector 36 includes the flat reflector member 60 having the flat reflector surface 37. The flat reflector surface 37 reflects the blue laser light B1, which is reflected by the aspheric reflector surface 35, toward the predetermined point P on the phosphor layer 41. Typically, the flat reflector surface 37 is specular. A reflector mirror is used as the flat reflector member, for example. The material of the flat reflector member 60 is not limited, and is made of a metal material, glass, or the like, for example.

Further, the flat reflector 36 includes the reflector-member holder 61 holding the flat reflector member 60, the support frame 62 supporting the bottom of the reflector-member holder 61 rotatably and tiltably, and the coupler 63 coupling the reflector-member holder 61 and the support frame 62 at the top side of the reflector-member holder 61.

As shown in FIG. 9, the reflector-member holder 61 is plate-type, and the concave 64 is formed on the approximately whole area of one surface thereof. The plate-type flat reflector member 60 is fitted in the concave 64. The reflector-member holder 61 is provided such that it stands up in the height direction (z-axis direction). The normal line direction of the surface including the concave 64, i.e., the normal line direction of the flat reflector surface 37, is perpendicular to the z axis.

The axis portions 65 are formed on the end portions of the reflector-member holder 61, and extend in the z-axis direction. The axis portions 65 are integrally formed with the reflector-member holder 61. For example, when the axis portions 65 are rotated, the reflector-member holder 61 is also rotated. As a result, the flat reflector member 60, which is held by the reflector-member holder 61, also moves integrally with the axis portions 65. In other words, the reflector-member holder 61 holds the flat reflector surface 37 integrally with the axis portions 65.

As shown in FIG. 9, the axis portions 65 are formed above and below the reflector-member holder 61 such that they are aligned in a straight line. The mount portions 66 are formed above and below the reflector-member holder 61, and the axis portions 65 are formed on the mount portions 66, respectively. The mount portions 66 formed above and below the reflector-member holder 61 have the same shape, and the axis portions 65 formed above and below the reflector-member holder 61 have the same shape.

One of the two axis portions 65 is inserted in the axis support hole 67 formed in the support frame 62. The other axis portion 65 is used as the handle 68, which is handled to adjust the angle of the flat reflector surface 37. The coupler 63 is mounted on the mount portion 66 at the handle 68 side. The axis portion 65 inserted in the axis support hole 67 is arbitrarily selected based on, for example, the arrangement position of the flat reflector surface 37, the design of the light-collection units 33, and the like.

When the reflector-member holder 61 is formed, the axis portions 65 having the same shape are formed above and below the reflector-member holder 61. In other words, the axis portion 65 and the handle 68 having the same shape may be formed without distinction. So it is possible to lower the manufacturing cost of the reflector-member holder 61. Further, because it is possible to select the axis portion 65 to be inserted in the axis support hole 67, it is possible to increase the degree of freedom of the reflector-member holder 61 to be mounted.

The support frame 62 includes the lower support 69, the upper support 70, and the coupling frame 71 coupling them. The lower support 69 and the upper support 70 are arranged at the positions approximately the same as the bottom and the top of the reflector-member holder 61 in the z-axis direction such that they face each other. The coupling frame 71 extends in the z-axis direction, and couples the lower support 69 and the upper support 70.

The axis support hole 67 is formed in the lower support 69, and supports the axis portion 65 of the reflector-member holder 61. Since the axis portion 65 is inserted in the axis support hole 67, the reflector-member holder 61 is supported rotatably and tiltably. As the axis support hole 67, an oval hole having a short-axis direction and a long-axis direction is formed, for example. A circular inserted axis is inserted in the oval axis support hole 67, the diameter of the circular inserted axis being approximately the same as the size of the axis support hole 67 in the short-axis direction. The inserted axis is inserted rotatably in the axis support hole 67 and tiltably in the long-axis direction. For example, according to this structure, a biaxial drive mechanism, which includes a rotary drive system about the axis portions 65 (axis B) as a rotary shaft, and a rotary drive system (tilt drive system) about the axis C as a rotary shaft with reference to the axis support hole 67, is realized. According to this structure, is possible to adjust the angle of the flat reflector surface 37 in the rotary direction and the tilt direction of the axis portions 65.

Note that the structure for supporting the axis portions 65 rotatably and tiltably is not limited to the above-mentioned structure, but an arbitrary structure may be used. Further, the material and the like of the support frame 62 including the lower support 69 and the reflector-member holder 61 including the axis portions 65 are not limited. For example, metal, plastic, and the like may be used arbitrarily.

As shown in FIG. 9, the support frame 62 is supported by the frame support member 74. The frame support member 74 is included in the support 32, which supports the flat reflector 36 and the like as one unit. In this embodiment, the support frame 62 is supported movably with respect to the frame support member 74 in the front-back direction (y-axis direction) of the light source apparatus 100. When the support frame 62 is moved in the y-axis direction, the reflector-member holder 61 and the support frame 62 are moved integrally. As a result, the position of the flat reflector surface 37 is adjusted.

The structure of the move mechanism, with which the support frame 62 is movable, is not limited. For example, guide members and the like for guiding the support frame 62 are formed above and below the frame support member 74. Further, spring members and the like elastic in the move direction may be used arbitrarily to thereby structure the move mechanism. Alternatively, an arbitrary structure may be employed. According to the move mechanism, a linear drive mechanism is realized, in which the axis D is the drive axis.

The position and the angle of the flat reflector surface 37 are adjusted when the screw 77 is temporarily loose. When the handle 68 is rotated, the angle of the flat reflector surface 37 is adjusted, the axis portions 65 being the center. As a result, it is possible to adjust the position of the focus point P in the lateral direction. Further, by moving the handle 68 in the front-back direction to tilt the axis portion 65, the inclination of the flat reflector surface 37 is adjusted. As a result, it is possible to adjust the position of the focus point P in the height direction. Further, by adjusting the position of the support frame 62 in the front-back direction, the focus position of the focus point P may be adjusted. After adjustment, the screw 77 is screwed, and the coupler 63 and the upper support 70 are fixed on the frame support member 74.

In the light source apparatus 100 in this embodiment, the two light-collection units 33 are arranged at the two symmetric positions about the axis A passing through the phosphor layer 41. According to this structure, the fifty-six, i.e., double, laser light sources 31 are provided. The brightness of white light emitted from the phosphor layer 41 may thus be increased.

If a condenser lens collects light from as many as fifty-six laser light sources 31, for example, it is necessary to prepare an enormously-large lens. However, in this embodiment, since the light-collection units 33 including the aspheric reflector surfaces 35 are used, it is possible to prevent the light source apparatus from being upsized. So it is possible to prevent the light source apparatus from being upsized and to increase the brightness at the same time.

Note that the blue laser light B1 from the two light-collection units 33 may be focused on one focus point P. Alternatively, the blue laser light B1 from the two light-collection units 33 may be focused on different focus points in different positions on the phosphor layer 41, respectively. Accordingly it is possible to prevent the phosphor layer 41 from being deteriorated.

In this embodiment, the optical-axis direction of the white light W from the phosphor unit 40 is the same as the direction of the blue laser light B1 emitted from the plurality of laser light sources 31. So the blue laser light B1 is handled easily. For example, when assembling the light source apparatus 100, adjusting the members, and the like, a user may understand the travelling direction of the blue laser light B1 easily. So, for example, it is possible to prevent unnecessary irradiation of laser light from occurring easily for safety reasons.

Further, in this embodiment, the aspheric reflector surface 35 is used to focus light on the phosphor 41. Accordingly it is possible to downsize the light source apparatus 100. For example even if the number of the laser light sources 31 is increased for higher brightness, it is possible to prevent the light-collection optical system 34 from being upsized. As a result, it is possible to prevent the device from being upsized and to increase the brightness at the same time. Further, since the aspheric reflector surface 35 is used, it is also possible to easily realize the structure depending on the necessary brightness and shape.

Further, in this embodiment, the flat reflector member 60 is used, which reflects the blue laser light B1 reflected by the aspheric reflector surface 35 toward the phosphor 41. Since such a reflector is provided, it is possible to increase a degree of freedom when designing the light-collection optical system 34. As a result, the light source apparatus 100 may be downsized, may have a desired shape, and the like.

Further, in this embodiment, the support 32 supports the plurality of laser light sources 31 and the light-collection optical system 34 as one unit. According to this structure, a plurality of units of the light-collection units 33 may be arranged easily. In other words, multiple units may be available. The shapes and the like of the light-collection units 33 may be changed freely. So it is possible to arbitrarily combine the light-collection units 33 having various structures to correspond to various specs.

[Cooling Structure]

Next, a cooling structure for cooling down the phosphor unit 40 of the light source apparatus 100 having the above-mentioned structure will be described. According to the cooling structure of the present technology, it is possible to cool down the phosphor wheel 42 and the motor 45 efficiently.

Figure 10:
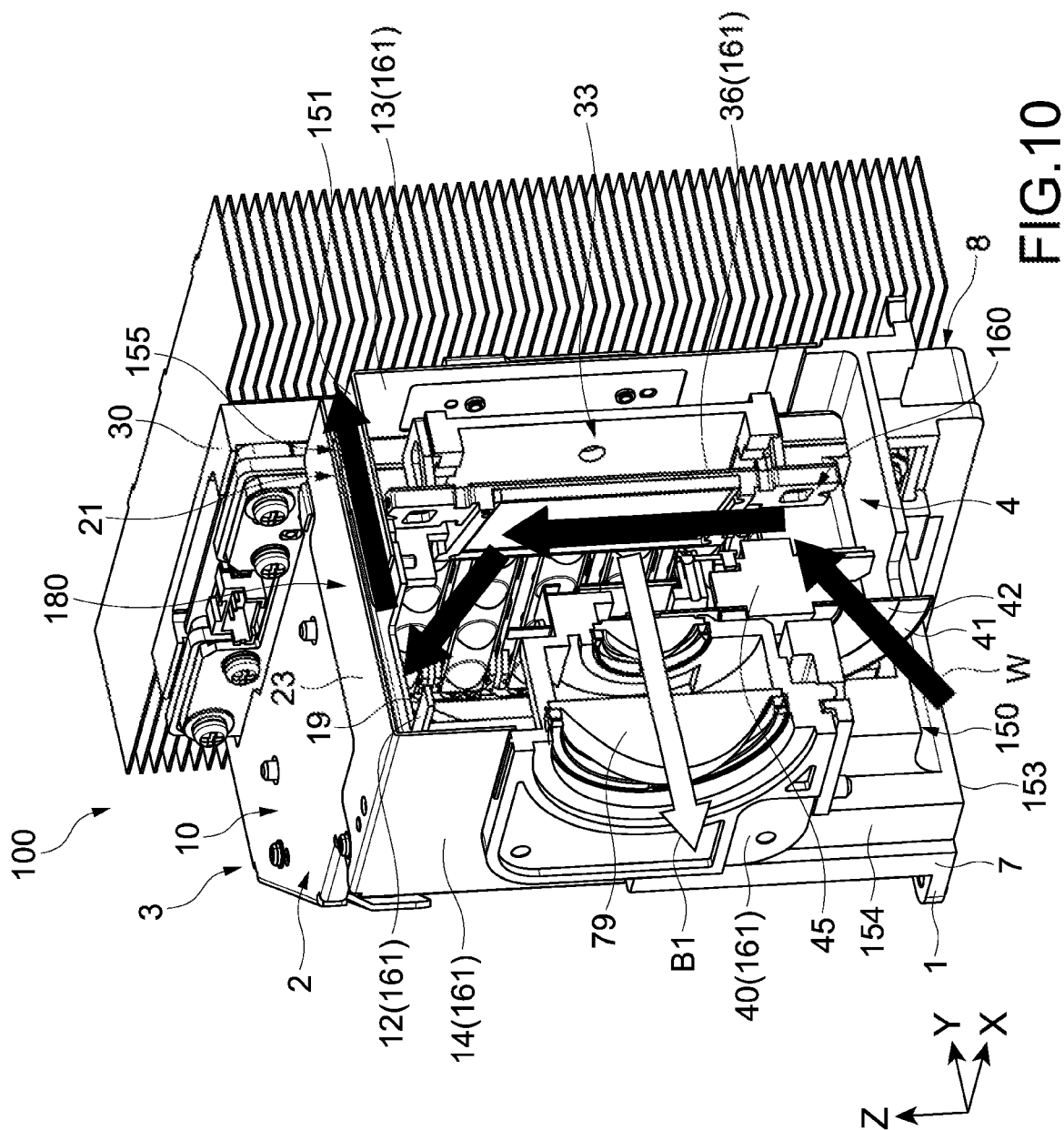
FIG. 10 A cross-sectional view showing the light source apparatus of FIG. 1 along the C-C line.
Figure 11:
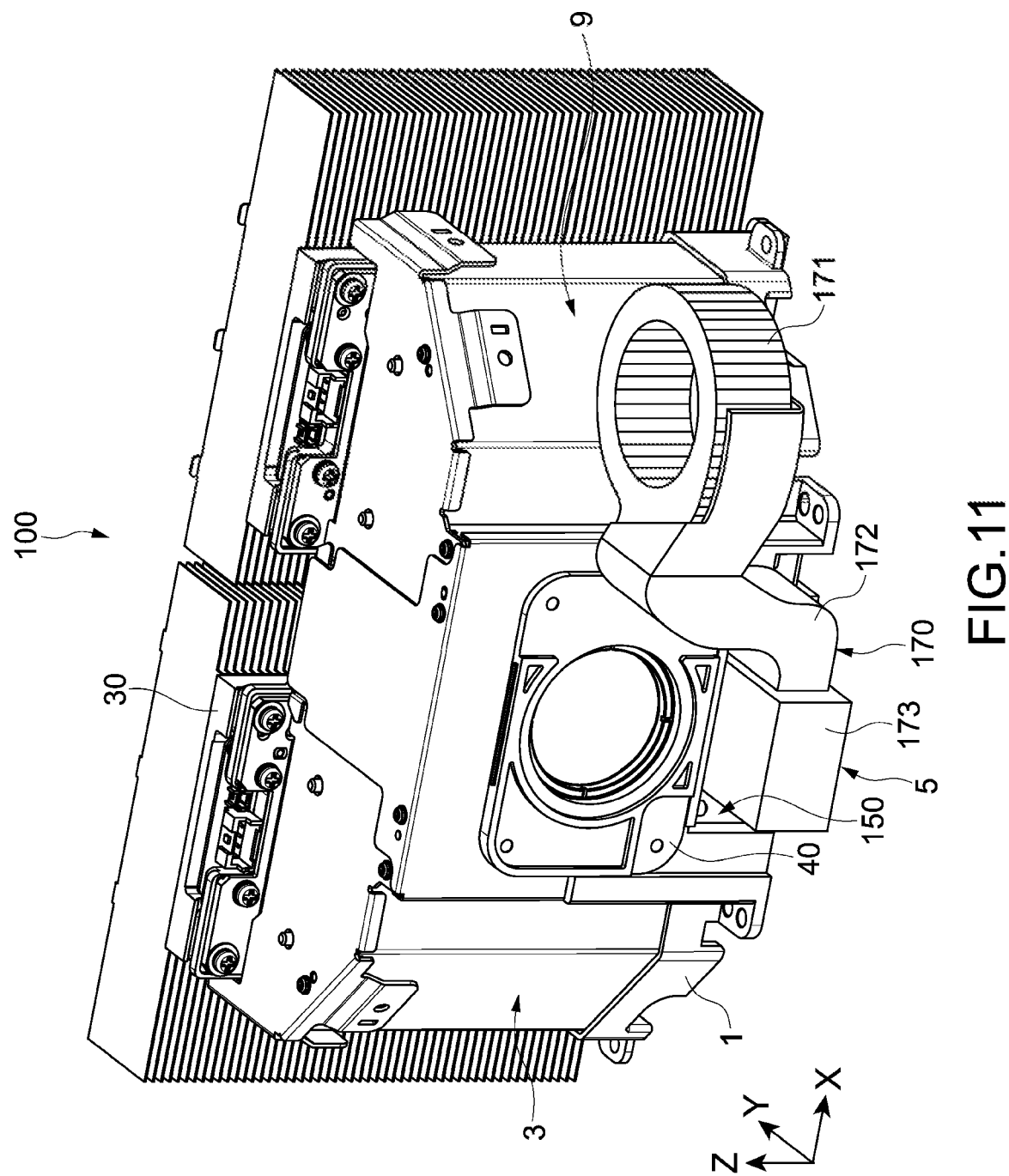
FIG. 11 A diagram showing a structural example of the airflow-sending unit for sending cooling airflow for cooling down the phosphor unit in the space of the housing of the light source apparatus.

FIG. 10 is a cross-sectional view showing the light source apparatus 100 of FIG. 1 along the C-C line. FIG. 11 is a diagram showing a structural example of the airflow-sending unit 170 for sending cooling airflow for cooling down the phosphor unit 40 in the space 4 of the housing 3 of the light source apparatus 100.

As shown in FIG. 1 and FIG. 10, the housing 3 includes the inlet 150 into which cooling airflow is drawn, and the outlet 151 from which the cooling airflow W is exhausted. The inlet 150 and the outlet 151 are formed such that they do not face the light path of the blue laser light B1 from the light source section 30 to the phosphor unit 40. The inlet 150 and the outlet 151 are formed at such positions that the blue laser light B1 travelling on the light path cannot be seen when the space 4 of the housing 3 is seen from the inlet 150 and the outlet 151, for example. This also means that the opening directions of the inlet 150 and the outlet 151 into the space 4 do not face the optical axis. Further, this also means that although an opening direction faces the optical axis, the opening direction does not directly face the optical axis because another member exists on the optical axis.

As described above, the phosphor unit 40 includes the phosphor wheel 42 for supporting the phosphor layer 41, the motor 45 rotating the phosphor wheel 42, and the condenser lens 79 for collecting white light. As shown in FIG. 10, the inlet 150 is formed at such a position that the cooling airflow W drawn from the inlet 150 is sent to the phosphor wheel 42 and the motor 45. As a result, the phosphor wheel 42 and the motor 45 may be cooled down efficiently. As a result, long-term reliability of the phosphor wheel 42 and the motor 45 may be secured.

In this embodiment, the phosphor unit 40 is arranged on the first edge portion 7 of the base 1. The inlet 150 is formed on the first edge portion 7 of the base 1 such that the inlet 150 faces the phosphor unit 40. As shown in FIG. 10, as the inlet 150, an opening is formed on the bottom surface 153 and the front surface 154 of the first edge portion 7 such that the opening faces the phosphor wheel 42. The cooling airflow W is sent from the inlet 150 in the front direction of the phosphor wheel 42 to the obliquely upward direction. In the vicinity of the phosphor wheel 42, the rotary centrifugal force of the wheel creates airflow. So the cooling airflow W is flowed in smoothly.

The outlet 151 is formed on the cap 10 side of the housing 3. In this embodiment, the two light source sections 30 are arranged on the second edge portion 8 of the base 1. The outlet 151 is formed near the cap 10 at the second edge portion 8 side. The outlet 151 is formed on an approximate center position between the two light source sections 30 in the lateral direction of the cap 10. This position is on the optical axis A of FIG. 3, and at the back side of the inlet 150 (see FIG. 12).

Since the outlet 151 is formed between the two light source sections 30, cooling airflow is exhausted smoothly. Further, airflow is sent to the heatsink 90 at the back side of the light source section 30 from a fan or the like. A design or the like for drawing cooling airflow from the outlet more efficiently by using the airflow from the fan may be available.

As shown in FIG. 10, in an area (the overlapped portion 21) in which the rear member 13 overlaps with the front member 14, both of which structure the chassis 2, the space 155 is formed between them. The back-end opening portion of the overlapped portion 21 is the outlet 151. Accordingly, the cooling airflow W passes through the space 155 of the overlapped portion 21, and is exhausted from the outlet 151.

Further, the curving portion 160 is formed in the space 4 being the flow path of the cooling airflow W, and is configured to curve the flow path of cooling airflow passing through the phosphor unit 40 from the inlet 150 to the outlet 151. The curving portion 160 is formed by arbitrarily arranging the curving member 161 on the path of the cooling airflow W, for example. As described above, since the flow path of the cooling airflow W from the inlet 150 to the outlet 151 is curved, it is possible to sufficiently prevent the blue laser light B1 from being leaked from the inlet 150 or the outlet 151. In other words, if the inlet 150 and the outlet 151 are formed at positions from which the blue laser light B1 is not leaked, it is possible to efficiently send the cooling airflow W travelling therebetween to a cool-down target. So it is effective to form the curving portion 160.

As the curving member 161 to form the curving portion 160, a member arranged in the space 4 of the housing 3 may be used. In other words, members and the like of the light-collection units 33 and the phosphor unit 40 are used arbitrarily as the curving member 161, their arrangement positions are arbitrarily designed, and the curving portion 160 may thus be formed. In this embodiment, the flat reflector 36 of the light-collection unit 33 curves the flow path of the cooling airflow W. Further, the rear member 13, the front member 14, and the like structuring the chassis 2 curve the flow path of the cooling airflow W. In other words, those members are used as the curving member 161. As a result, the number of components may be reduced, and the curving portion 160 may be structured easily.

As shown in FIG. 11, the airflow-sending unit (airflow-sender) 170 for sending the cooling airflow W to the inlet 150 is mounted on the front side 5 of the light source apparatus 100. The airflow-sending unit 170 includes the fan 171, the fan duct 172, and the sending duct 173. The rotary shaft of the fan 171 is provided in the height direction, and the fan 171 rotates in the horizontal direction (xy-plane direction). The fan 171 is arranged at an approximate center position in the height direction of the side wall 9. The fan duct 172 is arranged such that it is connected to the fan 171 and is bent downwardly toward the inlet 150 formed on the base 1. The end of the fan duct 172 is connected to the sending duct 173. The sending duct 173 is connected to the inlet 150 formed on the base 1, and the cooling airflow W is sent from the sending duct 173 to the inlet 150. As described above, since the airflow-sending unit 170 sends the cooling airflow W, the phosphor wheel 42 and the motor 45 may be sufficiently cooled down. Note that the structure and arrangement position of the airflow-sending unit 170 are not limited, but may be arbitrarily designed.

With reference to FIG. 10, the flow of the cooling airflow W from the inlet 150 to the outlet 151 will be described. First, the fan 171 of the airflow-sending unit 170 is rotated, and the cooling airflow W is sent to the inlet 150 via the fan duct 172 and the sending duct 173. As a result, the cooling airflow W is sent from the front side of the phosphor wheel 42 to the obliquely upward direction. After the cooling airflow W is blew on the phosphor wheel 42 and the motor 45, the flat reflector 36 curves the path of the cooling airflow W, and the cooling airflow W travels upward. At this time, the cooling airflow W travels along the back side of the phosphor unit 40. As a result, the phosphor wheel 42 and the motor 45 are sufficiently cooled down. The cooling airflow W travels upward from the opening 19 of the cap member 12 of FIG. 2. Then the top surface 23 of the front member 14, which is arranged so as to overlap with the cap member 12, curves the path, and the cooling airflow W travels backward. Then the cooling airflow W is exhausted from the outlet 151 to the outside of the housing 3 while the flow path is between the top surface 23 and the rear member 13.

Figure 12:
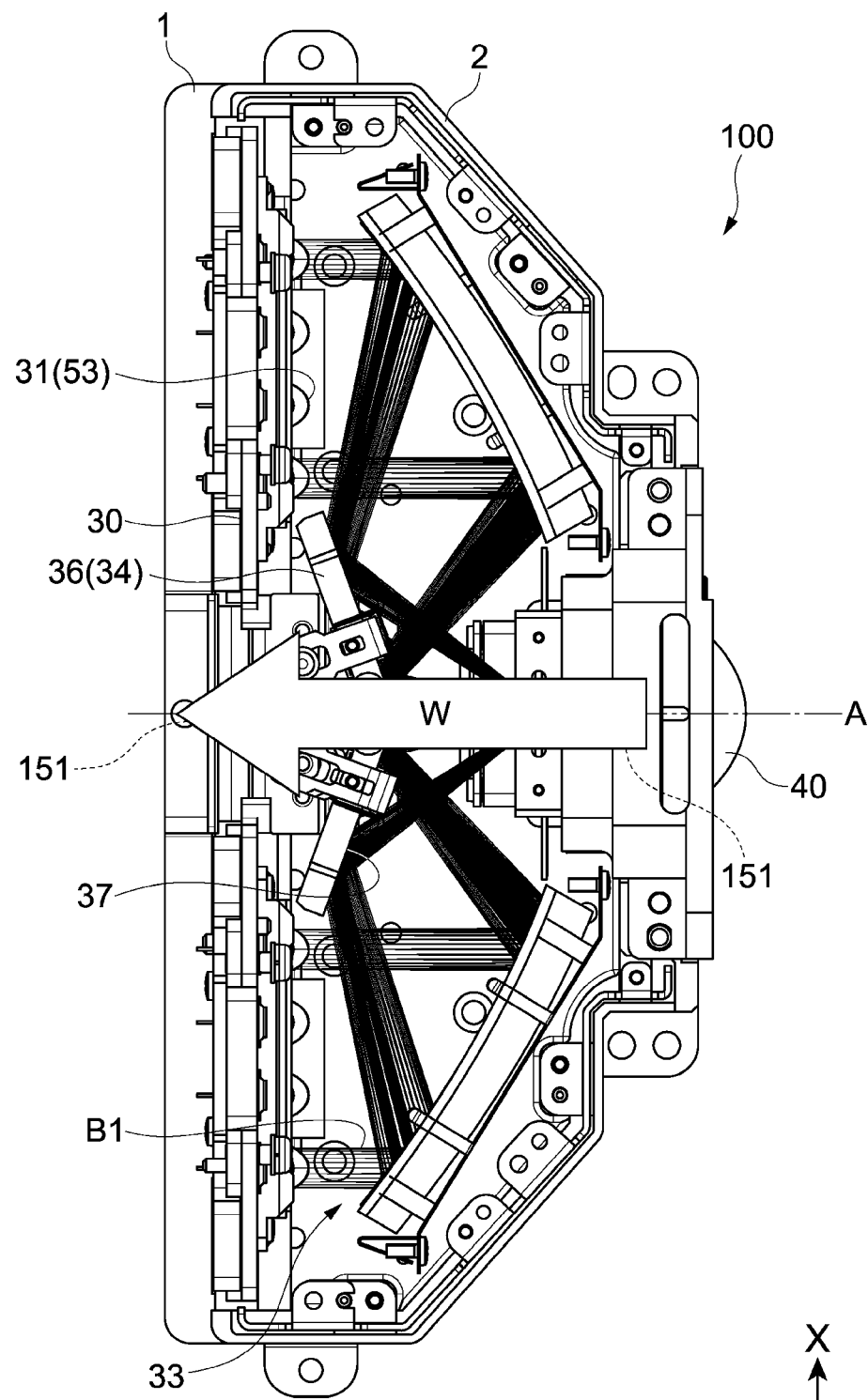
FIG. 12 A diagram showing the flow path of the cooling airflow when the light source apparatus of FIG. 3 is seen from the above.

As described above, in this embodiment, the cooling airflow from the inlet 150 passes through the phosphor unit 40 and travels to the outlet 151 in the second direction perpendicular to the direction of the optical axis A. Because the direction of the flow path of the cooling airflow W is perpendicular to the optical-axis direction, it is possible to prevent the blue laser light B1 from being leaked sufficiently and to cool down the device efficiently. Further, as shown in FIG. 12, seen from the above of the light source apparatus 100, the cooling airflow W travels in the direction of the optical axis A and in the direction opposite to the light path of the blue laser light B1. This structure is also effective to reduce leakage of light. Note that the flow path of the cooling airflow W is not limited to one perpendicular or opposite to the optical axis.

Note that in this embodiment, the flow path including and after the opening 19 of the cap member 12 is structured as the light-attenuation path 180 having a predetermined length toward the outlet 151. The light-attenuation path 180 is capable of sufficiently reducing the energy (intensity) of light even if incident light is leaked from the outlet 151. As a basic structure, a path, which has a cross section having the size approximately the same as the size of the outlet 151 and has a predetermined length, is formed toward the outlet 151. Even if light travels toward the outlet, the light is reflected by the inner wall of the path again and again, and the energy of the light is attenuated.

In this embodiment, as shown in FIG. 10, the light-attenuation portion 180 includes the opening 19 of the cap member 12, the top surface 23 of the front member 14, and the rear member 13 behind the opening 19. According to this structure, even if the blue laser light B1 is leaked from the outlet 151, it is possible to reduce the energy of the light and to sufficiently suppress the influence by the leaked light. In this embodiment, the chassis 2 includes a plurality of frame members. By arbitrarily designing the size of the overlapped portion 21, the arrangement positions of the members, and the like, the light-attenuation portion 180 may be formed easily. Note that the structure of the light-attenuation portion 180 is not limited. Further, the light-attenuation portion 180 may not be limited to the structure including a plurality of frame members.

As described above, in the light source apparatus 100 in this embodiment, the housing 3, which holds the light source section 30 and the phosphor unit 40, includes the inlet 150, the outlet 151, and the space 4. The cooling airflow W travels from the inlet 150 to the outlet 151 in the space 4 as a flow path, and cools down the phosphor unit 40 having the phosphor layer 41. The inlet 150 and the outlet 151 are formed so as not to face the blue laser light B1 from the light source section 30 to the fluorescence unit 40. According to this structure, it is possible to prevent the blue laser light B1 from being leaked from the housing 3, and to efficiently cool down the device. Further, by structuring the chassis 2 including a plurality of frame members, it is possible to easily realize the above-mentioned cooling structure and the light-attenuation portion 180.

Figure 13:
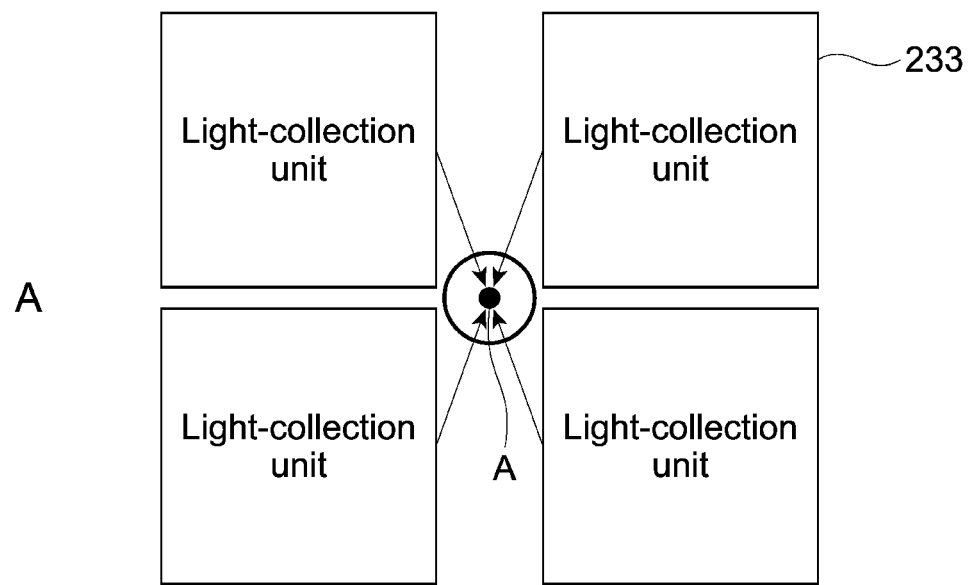
FIG. 13 Diagrams schematically showing other structural examples of arrangements of a plurality of light-collection units.
Figure 13:
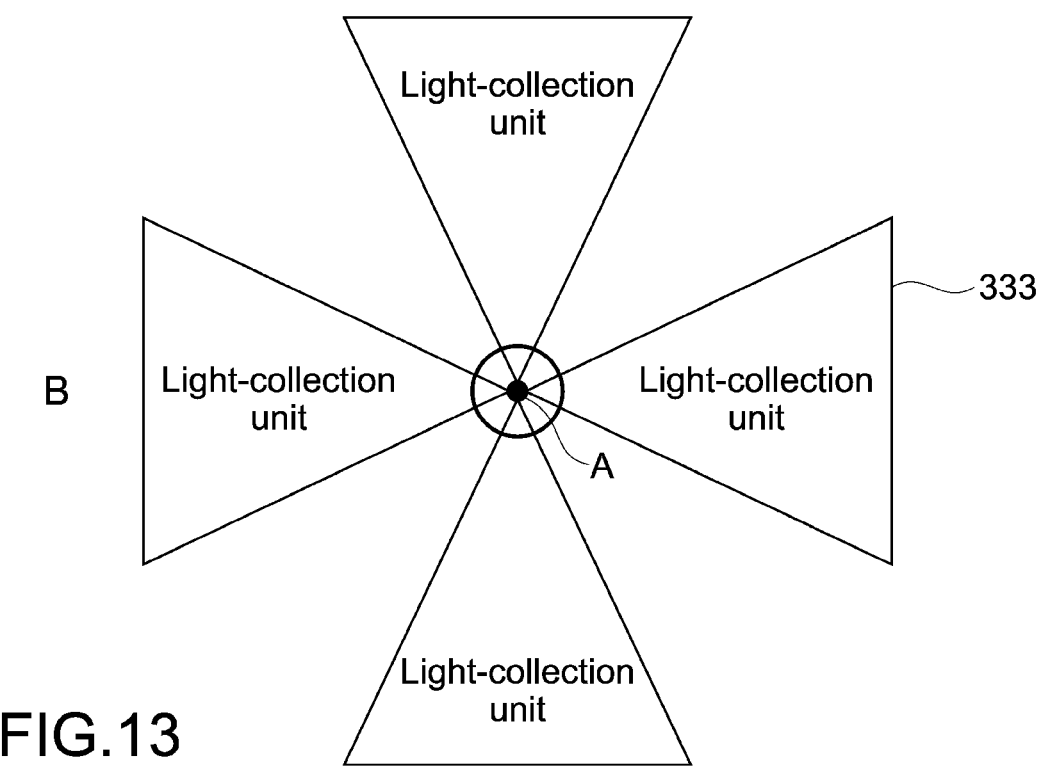

FIG. 13 are diagrams schematically showing other structural examples of arrangements of a plurality of light-collection units. For example, as shown in FIGS. 13A and B, four light-collection units 233 (333) may be symmetrically arranged about the optical axis A. The light-collection units 233 (333) are arbitrarily adjusted such that light is focused on a focus point on the optical axis A. The number of the light-collection units arranged is not limited, and more light-collection units may be arranged.

In FIG. 13A, as a layout surface on which a plurality of laser light sources are arranged, one having a rectangular planar shape is used. The planar shape of the layout surface is a planar shape seen in the emission direction of incident light from a plurality of laser light sources. For example, in the light source section 30 of FIG. 7, the planar shape of the plate-type frame 49 corresponds to the planar shape of the layout surface. As shown in FIG. 13, the outer shape of the light-collection unit 233 seen in the emission direction is also rectangular similar to the shape of the layout surface.

In FIG. 13B, as a layout surface on which a plurality of laser light sources are arranged, one having a triangular planar shape is used. Accordingly, it is possible to form the outer shape of the light-collection unit 333 triangular. Because an aspheric reflector surface is used as a light-collection optical system, the number of light sources, arrangements, and the like have a high degree of freedom. This is because the shape, size, and the like of the aspheric reflector surface may be designed arbitrarily depending on fluxes from the light sources. As a result, a light source, in which a plurality of light sources are arranged on a triangular layout surface, may be used as shown in FIG. 13B. Further, it is possible to realize a light-collection unit having a triangular outer shape seen in the optical-axis direction.

As described above, the shape of the light-collection unit may be designed freely. So it is possible to easily design the shape of the light-collection unit appropriate to multiple units, and to arrange a plurality of light-collection units in a limited space. As a result, the light source apparatus may be downsized.

Further, by arranging a plurality of light-collection units symmetrically about the optical axis A being the center, the number of light-collection units and the combination of light-collection units having various shapes may have a higher degree of freedom. As a result, various specs may be available. Note that the planar shape of a layout surface is not limited to a rectangle or a triangle, but may be a polygon, a circle, or the like. The shape of the layout surface may be arbitrarily determined corresponding to the shape of a necessary light-collection unit.

[Image Display Apparatus]

Figure 14:
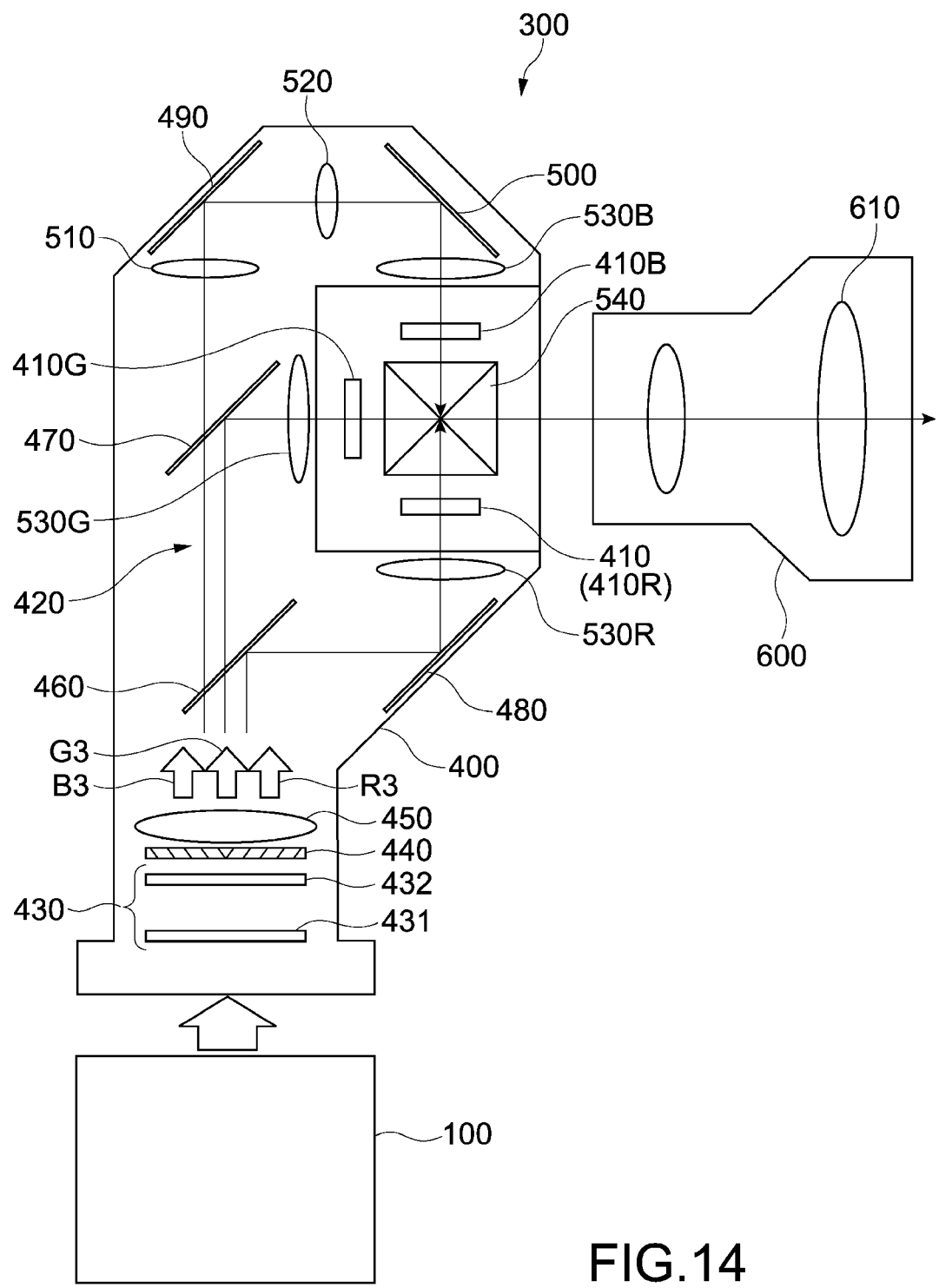
FIG. 14 A diagram schematically showing a structural example of the projector as the image display apparatus of the present technology.

An image display apparatus in this embodiment will be described. Here, a projector, on which the above-described light source apparatus of the above-mentioned embodiment is to be mounted, will be described as an example. FIG. 14 is a diagram schematically showing a structural example of the projector.

The projector 300 includes the light source apparatus 100 of the present technology, the lighting system 400, and the projecting system 600. The lighting system 400 includes the image-generating device 410 for generating an image with irradiation light, and the lighting optical system 420 irradiating the image-generating device 410 with incident light from the light source apparatus 100. The projecting system 600 projects an image generated by the image-generating device 410. The lighting system 400 functions as an image-generating system in this embodiment.

As shown in FIG. 14, the lighting system 400 includes the integrator device 430, the polarization-converting device 440, and the condenser lens 450. The integrator device 430 includes the first fly-eye lens 431, which includes a plurality of two-dimensionally aligned micro lenses, and the second fly-eye lens 432, which includes a plurality of micro lenses aligned corresponding to those micro lenses one by one.

The micro lenses of the first fly-eye lens 431 divide parallel light, which has entered the integrator device 430 from the light source apparatus 100, into a plurality of fluxes. The plurality of fluxes form images on the corresponding micro lenses of the second fly-eye lens 432. The micro lenses of the second fly-eye lens 432 function as secondary light sources, and the polarization-converting device 440 is irradiated with a plurality of parallel light fluxes having the same brightness as incident light.

As a whole, the integrator device 430 has a function of adjusting incident light from the light source apparatus 100, with which the polarization-converting device 440 is irradiated, to have a uniform brightness distribution.

The polarization-converting device 440 has a function of adjusting the polarization state of incident light entering via the integrator device 430 and the like. The polarization-converting device 440 emits incident light including blue laser light B3, green light G3, and red light R3 via the condenser lens 450 and the like arranged at the emission side of the light source apparatus 100, for example.

The lighting optical system 420 includes the dichroic mirrors 460 and 470, the mirrors 480, 490, and 500, the relay lenses 510 and 520, the field lenses 530R, 530G, and 530B, the liquid crystal light valves 410R, 410G, and 410B as image-generating devices, and the dichroic prism 540.

Each of the dichroic mirrors 460 and 470 is configured to selectively reflect color light having a predetermined wavelength band, and transmits light having the other wavelength band. With reference to FIG. 14, for example, the dichroic mirror 460 selectively reflects the red light R3. The dichroic mirror 470 selectively reflects the green light G3 out of the green light G3 and the blue light B3 passing through the dichroic mirror 460. The remaining blue light B3 passes through the dichroic mirror 470. As a result, light emitted from the light source apparatus 100 is divided into a plurality of color lights having different colors.

The red light R3 obtained by division is reflected by the mirror 480, passes through the field lens 530R, is thus parallelized, and then enters the liquid crystal light valve 410R for modulating red light. The green light G3 passes through the field lens 530G, is thus parallelized, and then enters the liquid crystal light valve 410G for modulating green light. The blue light B3 passes through the relay lens 510, is reflected by the mirror 490, further passes through the relay lens 520, and is reflected by the mirror 500. The blue light B3 is reflected by the mirror 500, passes through the field lens 530B, is thus parallelized, and then enters the liquid crystal light valve 410B for modulating blue light.

The liquid crystal light valves 410R, 410G, and 410B are electrically connected to a not-shown signal source (for example, PC, etc.) configured to supply image signals including image information. The liquid crystal light valves 410R, 410G, and 410B modulate incident light of each pixel based on supplied image signals of the respective colors, and generate a red image, a green image, and a blue image, respectively. The modulated light of the respective colors (formed images) enters the dichroic prism 540 and is synthesized. The dichroic prism 540 superposes and synthesizes light of the respective colors entering from the three directions, and emits the synthesized light to the projecting system 600.

The projecting system 600 includes the plurality of lenses 610 and the like, and irradiates a not-shown screen with the light synthesized by the dichroic prism 540. As a result, a full-color image is displayed.

Since the light source apparatus 100 of the present technology is provided, the projector 300 may be downsized. Further, by arbitrarily determining the shape and the like of the light source apparatus 100, the design of the outer shape of the projector 300 may be improved.

OTHER EMBODIMENTS

The present technology is not limited to the above-mentioned embodiment, but may be realized by other various embodiments.

In the projector 300 of FIG. 14, the lighting system 400 using a transmissive liquid crystal panel is shown. However, the lighting system may also be structured by using a reflective liquid crystal panel. As an image-generating device, a digital micro mirror device (DMD) or the like may be used. Further, instead of the dichroic prism 540, a polarization beam splitter (PBS), a color-synthesis prism for synthesizing RGB image signals, a TIR (Total Internal Reflection) prism, or the like may be used.

Further, in the above, as the image display apparatus of the present technology, a device other than a projector may be structured. Further, the light source apparatus of the present technology may be used in a device other than an image display apparatus.

At least two features of the features of the above-mentioned embodiments may be combined.

Note that the present technology may employ the following structures.
(1) A light source apparatus, including:
a light source section including one or more solid state light sources capable of emitting light of a predetermined wavelength band as incident light;
a light outputting section including a light emitting body configured to be excited by incident light from the light source section and to emit visible light having a wavelength band longer than a wavelength of the incident light, the light outputting section being capable of emitting synthetic light containing light having the predetermined wavelength band and visible light from the light emitting body; and a housing holding the light source section and the light outputting section, the housing including an inlet and an outlet formed not to face a light path of the incident light from the light source section to the light outputting section, and a space as a flow path of cooling airflow for cooling down the light outputting section, the cooling airflow being drawn into the inlet and exhausted from the outlet.
(2) The light source apparatus according to (1), in which
the space includes a curving portion for curving a flow path of cooling airflow travelling the light outputting section from the inlet to the outlet.
(3) The light source apparatus according to (1) or (2), in which
the light outputting section includes a wheel supporting the light emitting body, a motor for rotating the wheel, and a lens for focusing the synthetic light, and
the inlet is formed at such a position that the cooling airflow drawn into the inlet is sent to the wheel and the motor.
(4) The light source apparatus according to any one of (1) to (4), in which
the housing includes a base and a chassis supported by the base,
the light outputting section is held by the base, and
the inlet is formed to face the light outputting section.
(5) The light source apparatus according to (4), in which
the base has a planar shape, the base including a first edge portion and a second edge portion facing each other in a first direction,
the chassis includes a side wall extending in a second direction and a cap covering the side wall, the second direction being perpendicular to a planar direction of the base, the inlet is formed at the base side of the housing, and
the outlet is formed at the cap side of the housing.
(6) The light source apparatus according to (5), in which
the one or more solid state light sources are arranged on the second edge portion such that the incident light is emitted toward the first edge portion side in the first direction as an optical-axis direction,
the light outputting section is arranged on the first edge portion such that the synthetic light is emitted in the direction the same as the optical-axis direction,
the inlet is formed on the first edge portion of the base, and
the outlet is formed near the cap at the second edge portion side.
(7) The light source apparatus according to any one of (1) to (6), in which
the space has a light-attenuation path having a predetermined length formed toward the outlet.
(8) The light source apparatus according to any one of (4) to (7), in which
the chassis includes a plurality of frame members arranged such that an overlapped portion is formed, adjacent portions of members overlapping with each other in the overlapped portion.
(9) The light source apparatus according to (7), in which
the light-attenuation path is structured by a plurality of frame members arranged such that an overlapped portion is formed, adjacent portions of members as the chassis overlapping with each other in the overlapped portion.
(10) The light source apparatus according to (8) or (9), in which
the plurality of frame members are mounted one by one starting from the base and are thus assembled such that the plurality of frame members are not disassembled when the cap is fixed.

(11) The light source apparatus according to (10), in which the cap is fixed by a fixing member, a fixing status of the fixing member being capable of being released by using a dedicated releasing member.

(12) The light source apparatus according to any one of (1) to (11), further including:

an airflow-sender for sending the cooling airflow into the inlet.

DESCRIPTION OF SYMBOLS

A optical axis
B1 blue laser light
G2 green light
R2 red light
W white light
1 base
2 chassis
3 housing
4 space
7 first edge portion
8 second edge portion
9 side wall
10 cap
11 side wall member
12 cap member
13 rear member
14 front member
21 overlapped portion
30 light source section
31 laser light source
40 phosphor unit
41 phosphor layer
42 phosphor wheel
45 motor
150 inlet
151 outlet
160 curving portion
170 sending unit
180 light-attenuation portion
300 projector
400 lighting system
410 image-generating device
420 lighting optical system
600 projecting system

The invention claimed is:

1. A light source apparatus, comprising:
a light source section including one or more solid state light sources capable of emitting light of a predetermined wavelength band as incident light;
a light outputting section including a light emitting body configured to be excited by incident light from the light source section and to emit visible light having a wavelength band longer than a wavelength of the incident light, the light outputting section being capable of outputting synthetic light containing light having the predetermined wavelength band and visible light from the light emitting body; and
a housing holding the light source section and the light outputting section, the housing including an inlet and an outlet formed not to face a light path of the incident light from the light source section to the light outputting section, and a space as a flow path of cooling airflow for cooling down the light outputting section, the cooling airflow being drawn into the inlet, passing through the light outputting section, and being exhausted from the outlet,
wherein the cooling airflow is sent from the inlet in a front direction of a wheel supporting the light emitting body to an obliquely upward direction, and wherein a rotary centrifugal force of the wheel causes an additional airflow.

2. The light source apparatus according to claim 1, wherein
the space includes a curving portion configured to curve the flow path of the cooling airflow.

3. The light source apparatus according to claim 1, wherein
the light outputting section includes the wheel supporting the light emitting body, a motor for rotating the wheel, and a lens for focusing the synthetic light, and
the inlet is formed at such a position that the cooling airflow drawn into the inlet is sent to the wheel and the motor.

4. The light source apparatus according to claim 1, wherein
the housing includes a base and a chassis supported by the base,
the light outputting section is held by the base, and
the inlet is formed to face the light outputting section.

5. The light source apparatus according to claim 4, wherein
the base has a planar shape, the base including a first edge portion and a second edge portion facing each other in a first direction,
the chassis includes a side wall extending in a second direction and a cap covering the side wall, the second direction being perpendicular to a planar direction of the base,
the inlet is formed at a base side of the housing, and
the outlet is formed at a cap side of the housing.

6. The light source apparatus according to claim 5, wherein
the one or more solid state light sources are arranged on the second edge portion such that the incident light is emitted toward the first edge portion in the first direction as an optical-axis direction,
the light outputting section is arranged on the first edge portion such that the synthetic light is emitted in a same direction as the optical-axis direction,
the inlet is formed on the first edge portion of the base, and
the outlet is formed near the cap at a second edge portion side.

7. The light source apparatus according to claim 1, wherein
the space has a light-attenuation path having a predetermined length formed toward the outlet.

8. The light source apparatus according to claim 5, wherein
the chassis includes a plurality of frame members arranged such that an overlapped portion is formed, adjacent portions of members overlapping with each other in the overlapped portion.

9. The light source apparatus according to claim 7, wherein
the light-attenuation path is structured by a plurality of frame members arranged such that an overlapped portion is formed, adjacent portions of members as a chassis overlapping with each other in the overlapped portion.

10. The light source apparatus according to claim 8, wherein the plurality of frame members are mounted one by one starting from the base and are thus assembled such that the plurality of frame members are not disassembled when the cap is fixed.

11. The light source apparatus according to claim 10, wherein the cap is fixed by a fixing member, a fixing status of the fixing member being capable of being released by using a dedicated releasing member.

12. The light source apparatus according to claim 1, further comprising:

an airflow-sender for sending the cooling airflow into the inlet.

13. The light source apparatus according to claim 1, wherein opening directions of the inlet and the outlet into the space do not face an optical axis of the light outputting section.

14. The light source apparatus according to claim 1, wherein an opening direction of at least one of the inlet and the outlet faces an optical axis of the light outputting section but does not directly face the optical axis of the light outputting section due to a member between the optical axis of the light outputting section and at least one of the inlet and the outlet.

15. The light source apparatus according to claim 1, wherein the outlet is formed on a plane in which the inlet and at least a part of the flow path are present.

16. The light source apparatus according to claim 1, wherein at least a part of the flow path is in a direction perpendicular to an optical axis of the light outputting section.

17. The light source apparatus according to claim 1, wherein at least a part of the flow path is in a direction of an optical axis of the light outputting section.

* * * * *